(12) United States Patent
Kawashima et al.

(10) Patent No.: US 8,760,045 B2
(45) Date of Patent: Jun. 24, 2014

(54) SPARK PLUG FOR INTERNAL COMBUSTION ENGINES AND METHOD FOR MANUFACTURING THE SPARK PLUG

(75) Inventors: Yasushi Kawashima, Mie-ken (JP); Ken Hanashi, Oobu (JP)

(73) Assignee: Denso Corporation, Kariya (JP)

( * ) Notice: Subject to any disclaimer, the term of this patent is extended or adjusted under 35 U.S.C. 154(b) by 661 days.

(21) Appl. No.: 12/690,230

(22) Filed: Jan. 20, 2010

(65) Prior Publication Data
US 2010/0213812 A1 Aug. 26, 2010

(30) Foreign Application Priority Data

Jan. 20, 2009 (JP) ................................. 2009-009643

(51) Int. Cl.
*H01T 13/20* (2006.01)
(52) U.S. Cl.
USPC ............................................. 313/142; 445/7
(58) Field of Classification Search
CPC ......... H01T 13/00; H01T 13/20; H01T 13/32; H01T 21/02
USPC .................................................. 313/118–145
See application file for complete search history.

(56) References Cited

U.S. PATENT DOCUMENTS

| 5,373,214 | A | * | 12/1994 | McCready ..................... 313/142 |
| 5,395,273 | A |   | 3/1995  | Matsutani |
| 5,461,276 | A | * | 10/1995 | Matsutani et al. ............ 313/141 |
| 6,215,234 | B1 | * | 4/2001 | Abe et al. ....................... 313/141 |
| 6,304,022 | B1 |   | 10/2001 | Matsutani |
| 2007/0128964 | A1 | * | 6/2007 | Hori ................................. 445/7 |
| 2010/0109502 | A1 |   | 5/2010 | Nakayama et al. |

FOREIGN PATENT DOCUMENTS

| DE | 3820552 | * | 12/1989 |
| DE | 3820552 A1 | * | 12/1989 |
| JP | 04-242090 | | 8/1992 |
| JP | 06-045049 | | 2/1994 |
| JP | 06-096837 | | 4/1994 |
| JP | 06-338376 | | 12/1994 |
| JP | 11-204233 | | 7/1999 |
| JP | 2008-270189 | | 11/2008 |

OTHER PUBLICATIONS

Machine Translation of Lenk (DE-3820552).*
Hanashi et al. (WO 2009/017187) Published Feb. 5, 2009.*
Japanese Office Action dated Nov. 16, 2010, issued in corresponding Japanese Application No. 2009-009643, with English Translation.

* cited by examiner

*Primary Examiner* — Andrew Coughlin
(74) *Attorney, Agent, or Firm* — Nixon & Vanderhye P.C.

(57) ABSTRACT

A spark plug for internal-combustion engines equipped with a center electrode and a ground electrode is provided. In the spark plug, the ground electrode is fixed to a mount fitting, while the ground electrode has a convex portion. The convex portion is made of a part of base materials of the ground electrode where the part is facing the center electrode, and is projected toward the center electrode. The convex portion has a fusion solidification part made of precious metal materials and a part of the base materials melted together and solidified at least on part of an electric discharge surface facing the center electrode.

7 Claims, 26 Drawing Sheets

SPARK PLUG FOR INTERNAL COMBUSTION ENGINES AND METHOD FOR MANUFACTURING THE SPARK PLUG

CROSS-REFERENCE TO RELATED APPLICATION

This application is based on and claims the benefit of priority from earlier Japanese Patent Application No. 2009-009643 filed on Jan. 20, 2009, the description of which is incorporated herein by reference.

BACKGROUND OF THE INVENTION

1. Technical Field of the Invention

This invention relates to a spark plug for internal combustion engines used for automobiles, cogenerations, gas feeding pumps, etc. and a method for manufacturing the spark plug.

2. Description of the Related Art

Spark plugs are still used abundantly as an ignition means of a fuel-air mixture introduced into a combustion chamber of internal-combustion engines used for automobiles, etc.

As an example, a spark plug disclosed in Japanese Patent Application Laid-Open Publication No. 11-204233 is known.

The spark plug disclosed in the publication is shown in FIGS. 34 and 35. As shown in the figures, the spark plug 9 has a center electrode 94 and a ground electrode 95.

The ground electrode 95 is fixed to a mount fitting 92, while the ground electrode 95 has a projection part 951. The projection part 951 is made of a part of base materials of the ground electrode 95 where the part is facing the center electrode 94, and is projected toward the center electrode 94. A precious-metal-chip 953 is welded to an electric discharge surface 952 of the projection part 951.

However, there are the following problems in the above-mentioned spark plug 9.

That is, the precious-metal-chip 953 and the base material of the ground electrode 95 are joined only at a joint part 954. In another words, the precious-metal-chip 953 and the base material of the ground electrode 95 are welded only on the circumference of contacting surfaces of the projection part 951 and the precious-metal-chip 953.

For this reason, if heat stress acts on the joint part 954 by a thermal cycle, a crack or oxidization will take place in the joint part 95 fourthus the reliability in joint of the precious-metal-chip 953 and the base material of the ground electrode 95 will fall.

In addition, since the thermal conductivity of the joint part 954 is smaller than that of the precious-metal-chip 953, heat radiation of the precious-metal-chip 953 worsens, and there is a possibility that the temperature may rise thereof. Thereby, the precious-metal-chip 953 is worn and there is a possibility that demand voltage may become large.

Further, in order to lower demand voltage, it is necessary to make a spark discharge gap G formed between the center electrode 94 and the precious-metal-chip 953 small, but in this case, the amount of the precious metals used will increase, and there is a possibility that the cost of manufacturing the spark plug 9 may rise.

SUMMARY OF THE INVENTION

The present invention has been made in order to solve the issue described above, and has as its object to provide a spark plug for internal-combustion engines that offers excellence in durability and reliability in the joint portion at low cost.

According to the present invention, various modes of invention are offered to achieve the above objects.

In a spark plug for internal-combustion engines according to a first aspect, there is provided a spark plug including a mount fitting having a screw part for attachment formed on its own perimeter, a porcelain insulator that is held inside the mount fitting while it has an insulator tip part arranged so that its tip side is projected outwardly from the mount fitting, a center electrode that is held inside the porcelain insulator while it has an electrode tip part arranged so that its tip side is projected outwardly from the porcelain insulator, and a ground electrode where a spark discharge gap is formed between the ground electrode and the center electrode while precious metals are provided on an electric discharge surface facing the center electrode.

The ground electrode is fixed to the mount fitting, while the ground electrode has a convex portion.

The convex portion is made of a part of base materials of the ground electrode where the part is facing the center electrode, and is projected toward the center electrode at an opposing surface, a surface at the center electrode side of the ground electrode.

The convex portion has a fusion solidification part made of precious metals and the part of the base materials melted together and solidified at least on part of the electric discharge surface.

Here, a fusion solidification part is the domain where the ingredient of the base material of the ground electrode and the ingredient of the precious metal chip mixed mutually. The crystal of the mixture that forms the domain is a domain where the portion of a single metallic crystal and the portion alloyed in part come to be intermingled, and the average value of the amount of ingredients of the precious metals becomes 80% or less.

In a method for manufacturing the spark plug for internal-combustion engines according to a first aspect, the spark plug includes a center electrode, a ground electrode where a spark discharge gap is formed between the ground electrode and the center electrode, and a convex portion made of a part of base materials of the ground electrode where the part is facing the center electrode, and is projected toward the center electrode at an opposing surface, a surface at the center electrode side of the ground electrode The method comprises that, first, all of precious metals and the part of the base materials of the ground electrode are melted together by arc welding on at least a part of the electric discharge surface on the convex portion.

Then, the melted portion is solidified.

Then, the base material of the ground electrode is positioned on a metal die that has a cavity for forming convex portion in the state where the cavity and the opposing surface face each other.

Then, the convex portion having a fusion solidification part is formed at least on part of the electric discharge surface by pressing a part of the base materials of the ground electrode toward the cavity for convex portion using a pressing jig.

In the method for manufacturing the spark plug for internal-combustion engines according to a second aspect, the spark plug includes a center electrode, a ground electrode where a spark discharge gap is formed between the ground electrode and the center electrode, and a convex portion made of a part of base materials of the ground electrode where the part is facing the center electrode, and is projected toward the center electrode at an opposing surface, a surface at the center electrode side of the ground electrode.

The ground electrode has a concave portion that is formed on a rearside of the ground electrode facing toward an opposing surface.

The rearside of the ground electrode is a surface opposite to the opposing surface in the ground electrode.

The convex portion is formed so that an extension of an axis of the convex portion passes through an area in which the concave portion is formed.

The method comprises that, first, precious metals and the part of the base materials of the ground electrode are melted together by arc welding on at least a part of the electric discharge surface on the convex portion.

Then, the melted portion is solidified

Then, the base material of the ground electrode is positioned on a metal die that has a cavity for forming convex portion in a state where the cavity and the opposing surface face each other.

Then, the concave portion is formed by pressing a part of a rearside of the ground electrode using a pressing jig, while the convex portion is formed at least on a part of the electric discharge surface by pressing a part of the base materials of the ground electrode toward the cavity for convex portion using the pressing jig.

DETAILED DESCRIPTION OF PREFERRED EMBODIMENTS

Preferred embodiments according to the present invention will be described with reference to the drawings.

First Embodiment

The first embodiment is explained with reference to FIGS. 1-11.

Figure 1:
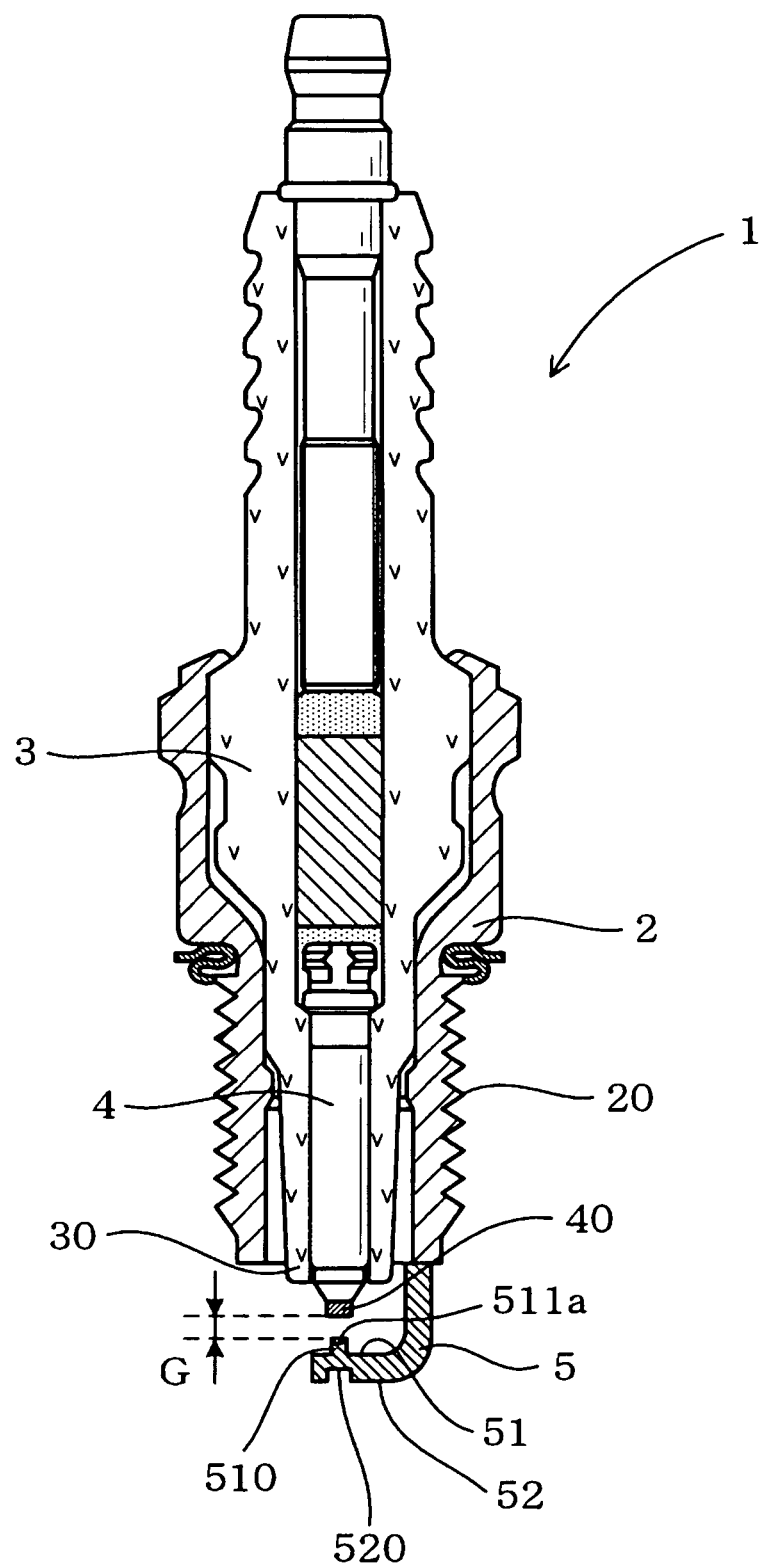
FIG. 1 shows a longitudinal section of a spark plug in a first embodiment of the present invention.

A spark plug 1 of the present embodiment has a mount fitting 2, a porcelain insulator 3, a center electrode 4, and a ground electrode 5, as shown in FIG. 1.

Specifically, the mount fitting 2 has a screw part 20 for attachment formed on its own perimeter.

The porcelain insulator 3 is held inside the mount fitting 2 while it has an insulator tip part 30 arranged so that its tip side is projected outwardly from the mount fitting 2.

The center electrode 4 is held inside the porcelain insulator 3 while it has an electrode tip part 40 arranged so that its tip side is projected outwardly from the porcelain insulator 3.

Moreover, a spark discharge gap G is formed between the ground electrode 5 and the center electrode 4.

The ground electrode 5 is fixed to the mount fitting 2, while the ground electrode 5 has a convex portion 510. The convex portion 510 is made of a part of base materials of the ground electrode 5 where the part is facing the center electrode 4, and is projected toward the center electrode 4 at an opposing surface 51, a surface at the center electrode 4 side of the ground electrode 5.

In addition, the convex portion 510 has a fusion solidification part 511a made of precious metals and the part of the base materials melted together at least on part of an electric discharge surface 511 that is a surface faces the center electrode 4.

Details are explained hereafter.

The above-mentioned spark plug 1 may be used as an ignition means for internal-combustions engine used in automobiles, cogenerations, gas feeding pumps, etc.

The composition of the spark plug 1 is explained.

As mentioned above, the spark plug 1 has the mount fitting 2 that has the screw part 20 formed on its own perimeter.

Moreover, the spark plug 1 is screwed into a wall part of a combustion chamber (not shown) of the internal-combustion engine at the screw part 20.

Figure 2:
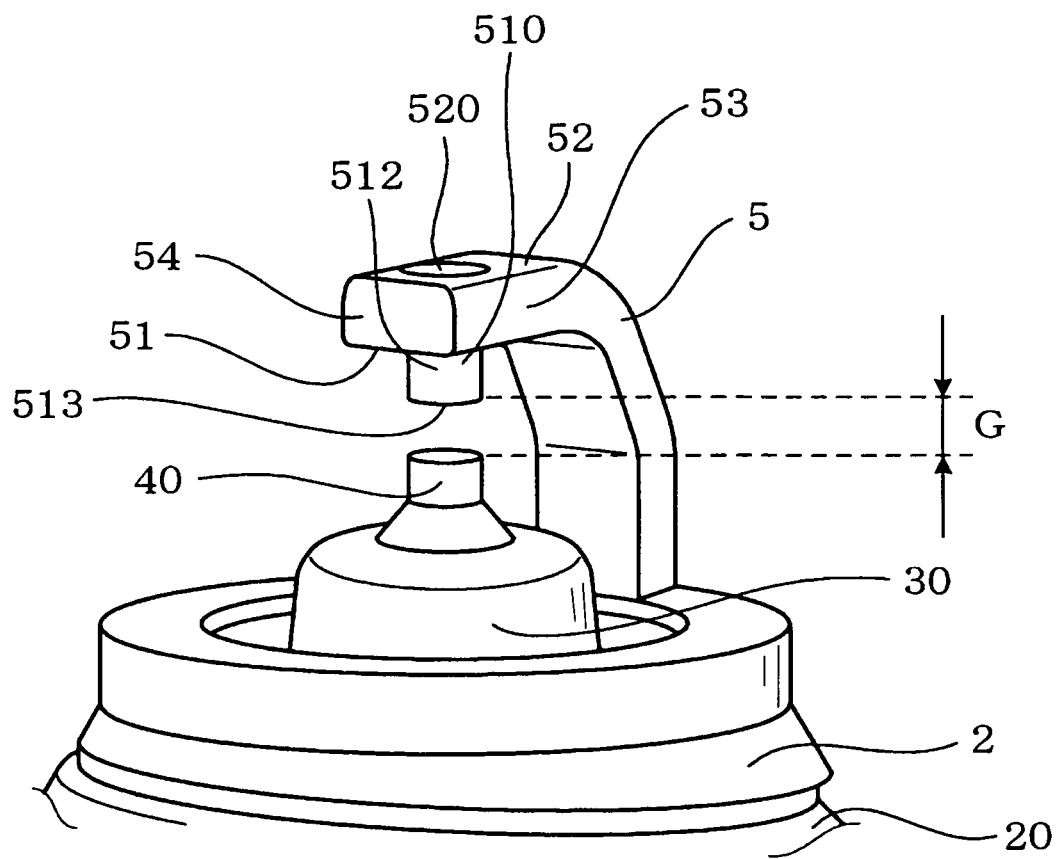
FIG. 2 shows a perspective view of a tip part of the spark plug in the first embodiment.

As shown in FIG. 1 and FIG. 2, one end of the ground electrode 5 is attached on a tip side of the mount fitting 2, and the ground electrode 5 is bent so that the convex portion 510 formed in the other end of the ground electrode 5 face the electrode tip part 40 of the center electrode 4.

The electrode tip part 40 of the above-mentioned center electrode 4 facing the convex portion 510 may be a chip of the precious metals including Ir, Rh, Ru, etc.

As shown in FIGS. 1-3 and FIGS. 6-8, the ground electrode 5 has a concave portion 520. The concave portion 520 is formed on a rearside of the ground electrode 52 facing toward the opposing surface 51. The rearside of the ground electrode 52 is a surface opposite to the opposing surface 51 in the ground electrode 5.

Figure 3:
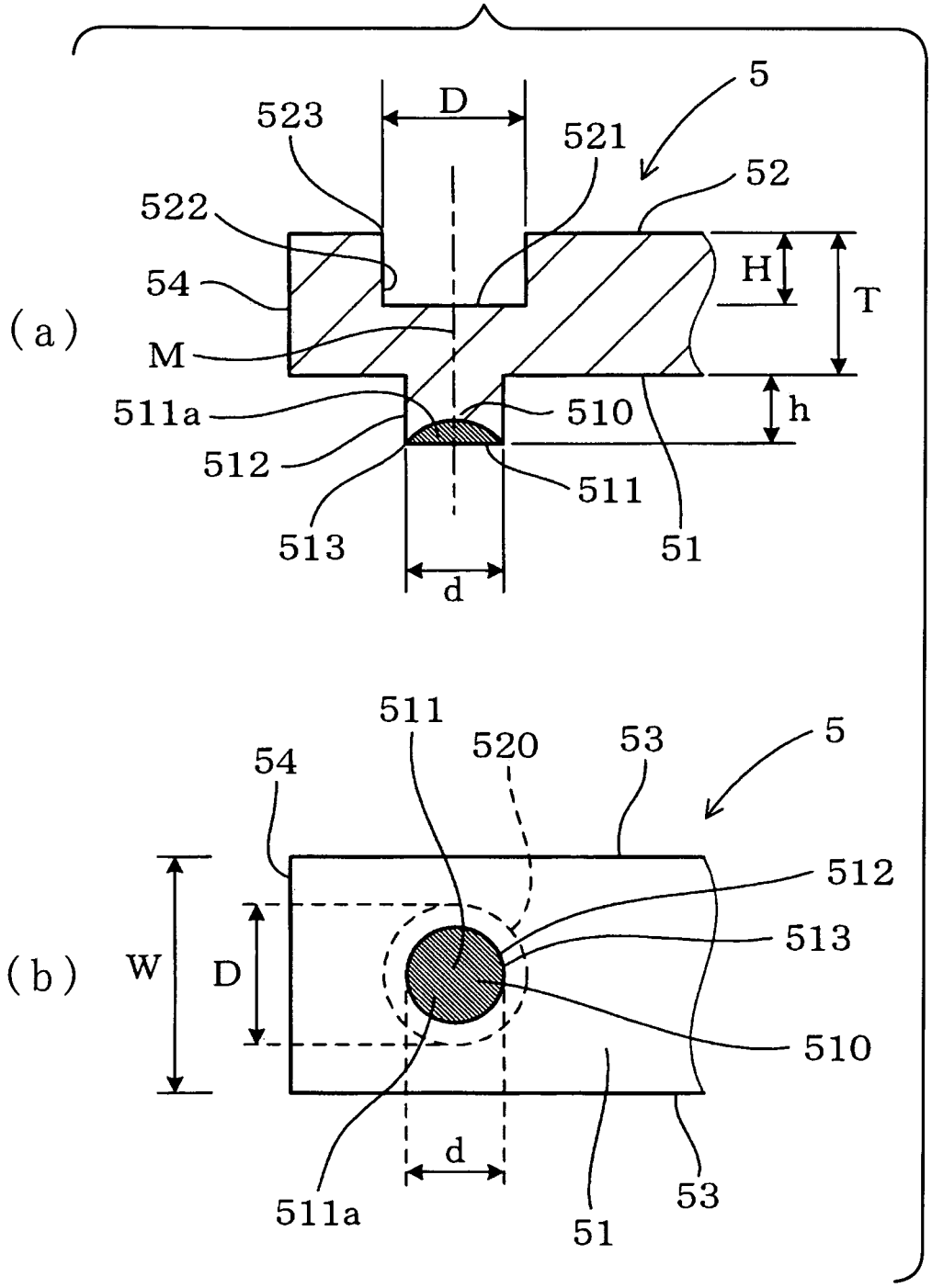
FIG. 3 show a sectional view and an upper surface view of a tip portion of a ground electrode, respectively, in the first embodiment.

Explaining the physical relationship between the concave portion 520 and the convex portion 510, in the present embodiment, as shown in FIG. 3 (a), the convex portion 510 is formed so that an extension of an axis M of the convex portion 510 passes through an area in which the concave portion 520 is formed.

As mentioned above, the fusion solidification part 511a made of precious metals and the part of the base materials melted together is formed at least on a part of the electric discharge surface 511.

In the present embodiment, as shown in FIGS. 3-8, the fusion solidification part 511a is formed on entire surface of the electric discharge 511.

It should be appreciated that if the fusion solidification part 511a is formed with 40% or more of the area to the area of the electric discharge surface 511, functions and effects of the present invention can fully be demonstrated.

In addition, in the spark plug 1 of the present embodiment, when an area of an opening 523 of the concave portion 520 is set to S1, and an average cross-section area of a section of the convex portion 510 that intersects perpendicularly in an axial direction of the spark plug 1 is set to s, the relation of S1>=s is satisfied.

The average cross-section area s of the convex portion 510, by the way, is obtained by dividing a volume v of the convex portion 510 by an amount of projection h, i.e., s=v/h.

In addition, both the convex portion 510 and the concave portion 520 are formed nearly in pillar shapes in the present embodiment.

Therefore, as shown in FIG. 3 for example, when the diameter of the convex portion 510 is set to d, and the diameter of the concave portion 520 is set to D, the relation of D>=d is satisfied in the spark plug 1 of the present embodiment.

Further, the ground electrode 5 may be of a nickel group alloy that contains Ti with the nickel as a main ingredient, for example.

Furthermore, in the spark plug 1 of the present embodiment, the diameter d of the convex portion 510 may be set to 1.5 mm, the diameter D of the concave portion 520 may be set to 1.7 mm, and a width W of the ground electrode 5 may be set to 2.8 mm, for example.

That is, in the spark plug 1 of the present embodiment, besides the relation of W>D, the relation of D>=d is satisfied as mentioned above.

In addition, a thickness T of the ground electrode 5 may be set to 1.6 mm. That is, when a depth of the concave portion 520 in the axis direction of the spark plug 1 is set to H, the relation of H<=(3/4) T is satisfied in the spark plug 1 of the present embodiment.

The electric discharge surface 511 is formed as a flat surface on the convex portion 510, while a corner portion 513 is provided between the electric discharge surface 511 and a side surface 512.

In the present embodiment, however, not as FIGS. 10 and 11 mentioned later, the fusion solidification part 511a is not necessarily formed in the entire corner portion 513.

Figure 9:
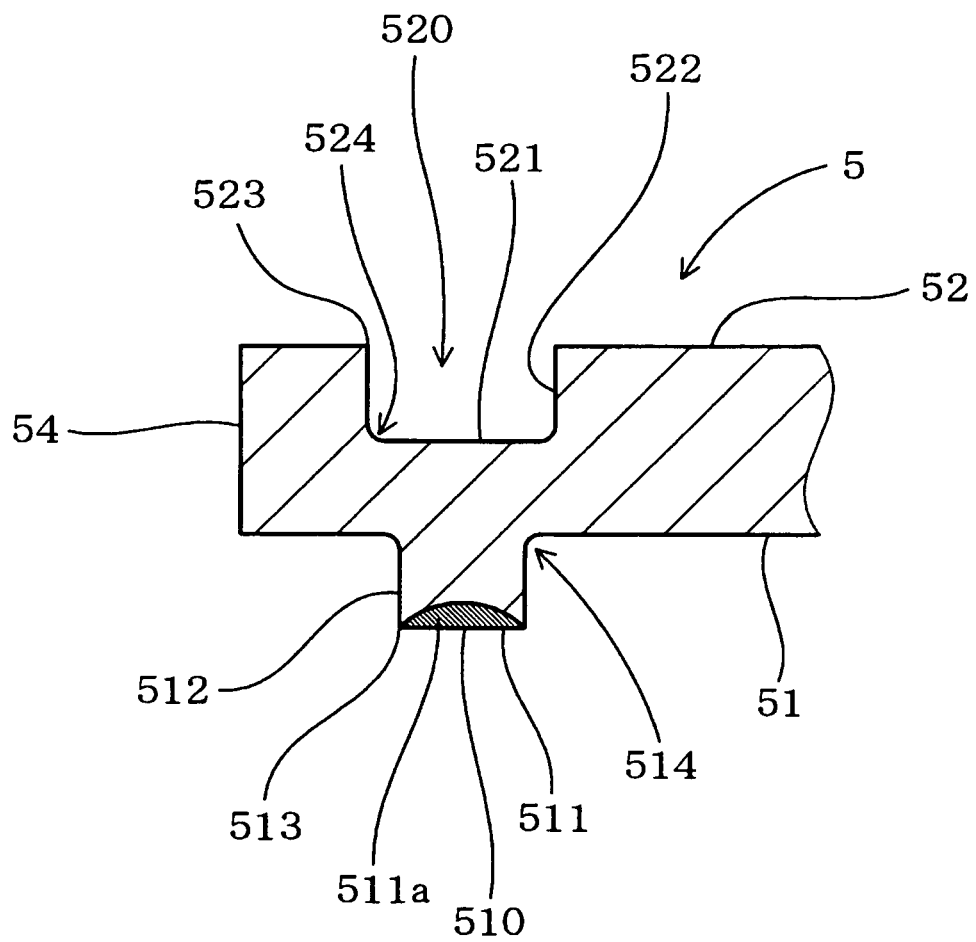
FIG. 9 shows a sectional view of the tip portion of the ground electrode that has curved surfaces in root parts of the convex portion and bottom parts of the concave portion in the first embodiment.

As shown in FIG. 9, a root part 514 of the convex portion 510 may be formed in a curved surface, as well as a bottom corner portion 524 of the concave portion 520 may be formed in a curved surface.

In this case, by setting a curvature radius in the root part 514 of the convex portion 510 and a curvature radius in the bottom corner portion 524 of the concave portion 520 to 0.1 mm or more, a stress concentration after processing the ground electrode 5 in the root part 514 and the bottom corner portion 524 may be suppressed.

Thereby, the crack in the ground electrode 5 may be suppressed in a thermal environment at the time of engine operation.

It should be appreciated that the amount of projection h of the convex portion 510 in the axial direction of the spark plug 1 is 0.7 mm, and the depth H of the concave portion 520 in the axial direction of the spark plug 1 is 1.1 mm in the present embodiment.

The depth H of the concave portion 520 is larger than the amount of projection h of the convex portion 510 (H>h), and the volume of the concave portion 520 is larger than the volume of the convex portion 510 in the spark plug 1 of the present embodiment as mentioned above, this is because a part of the ground electrodes 5 inevitably spreads into portions other than convex portion 510 when manufacturing the convex portion 510.

It is therefore preferred to suppress the spreading of the part of the ground electrodes 5 into the portions other than convex portion 510 by forming the section that intersects the ground electrode 5 perpendicularly in the axial direction into rectangle infinitely, for example.

The amount of projection h is not restricted to the value mentioned above, but may be set to 0.3 mm<=h<=1.1 mm, for example.

When h>=0.3 mm, the ability of igniting spark plugs may be raised. That is, by separating the opposing surface 51 of the ground electrode 5 from an initial flame that lights fuel-air mixture by electric discharge sparks 0.3 mm or more, the initial flame can be easily spread, thus the ability of igniting the spark plugs is raised.

In addition, when h<=1.1 mm, the rise in temperature of the tip part of the convex portion 510 may be suppressed, and the pre-ignition under engine operation may be suppressed.

Next, an example of the measuring method of each size mentioned above is shown.

That is, the size of each part is measured in the section that cut the processing portion of the ground electrode 5 as shown in FIG. 3, for example.

In the measurement, the parts may be project by using a projector, for example, for magnifications, such as 10 times, and measured, or may be measure using enlarged pictures.

Specifically, measuring a length of the convex portion 510 in the width direction in the above-mentioned section gives the diameter d of the convex portion 510. In addition, measuring a length of the concave portion 520 in the width direction in the above-mentioned section gives the diameter D of the concave portion 520.

Further, measuring a length from the opposing surface 51 of the ground electrode 5 to the electric discharge surface 511 of the convex portion 510 in the above-mentioned section gives the amount of projection h of the convex portion 510. Furthermore, measuring the distance from the rearside of the ground electrode 52 of the ground electrode 5 to the bottom part 521 of the concave portion 520 similarly gives the depth H of the concave portion 520.

Next, the method of manufacturing the spark plug 1 of the present embodiment is explained together with FIGS. 4-8.

Figure 8:
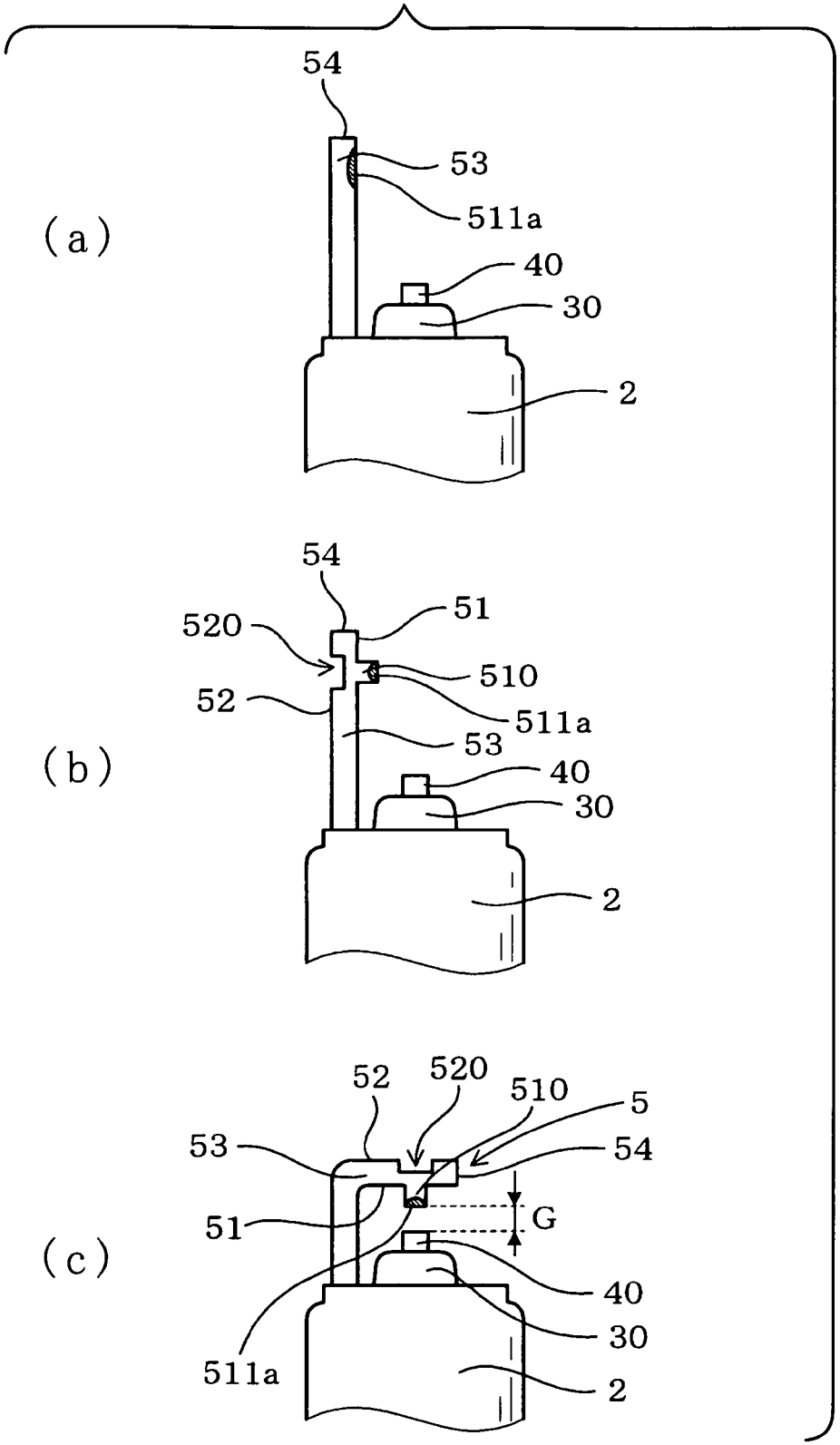
FIG. 8 shows the tip part of the spark plug in the state before forming the convex portion and the concave portion, the tip part of the spark plug in the state after forming the convex portion and the concave portion, and the tip part of the spark plug in which the state where a spark discharge gap is formed, respectively, in the first embodiment.

First, as shown in FIG. 8 (a), the center electrode 4 and other parts are inserted inside the mount fitting 2 where the ground electrode 5 is fixed.

Figure 4:
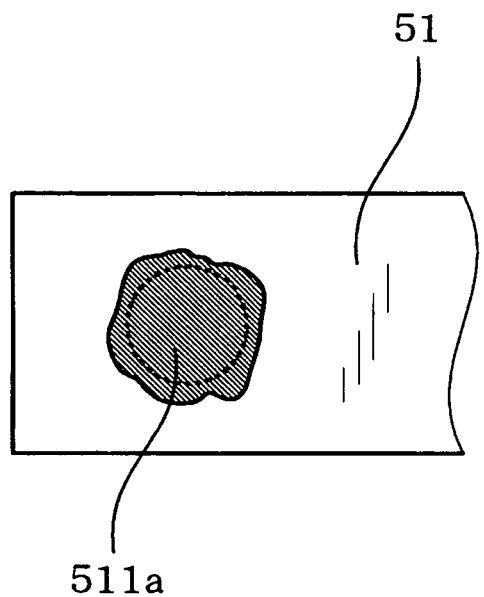
FIG. 4 shows a plain view of a fusion solidification part in a state before forming a convex portion in the first embodiment.
Figure 5:
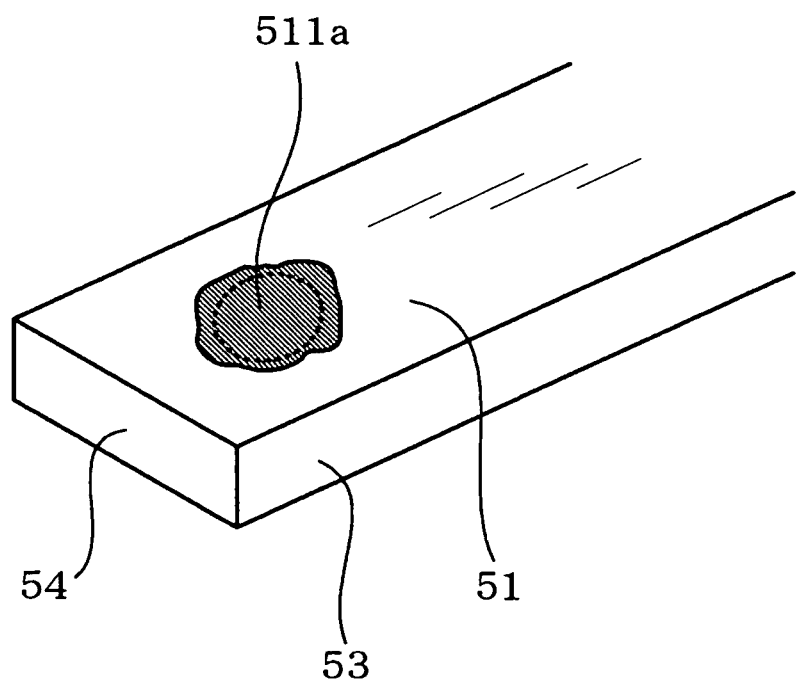
FIG. 5 shows a perspective diagram of the fusion solidification part in the state before forming the convex portion in the first embodiment.

Subsequently, as shown in FIGS. 4 and 5, precious metals and the part of the base materials of a ground electrode 5 are melted together by arc welding slightly larger in an area than an area intended for the electric discharge surface 511 on the base material of the plate-like ground electrode 5.

Specifically, after laying the chip of the precious metals on the portion that is intended to form the above-mentioned electric discharge surface 511, having the chip melted with the part of the base materials of the ground electrode 5 by arc welding, and a melted portion is solidified afterwards to form a portion equivalent to the fusion solidification part 511a.

In the above-mentioned arc welding, it is preferred that metal ratio near the electric discharge surface 511 of the fusion solidification part 511a is 70% or more, while it is preferred that metal ratio near the base material of the ground electrode 5 of the fusion solidification part 511a is 50% or less.

In addition, it is preferred to use Ir, Pt, Rh, etc. for the above-mentioned precious metals. On the other hand, it is also preferred to use a Ni—Cr group alloy or a Ni—Cr—Al group alloy, etc. besides nickel group alloy that contains Ti with the nickel as the main ingredient, as mentioned above, for the base material of the ground electrode.

For the above-mentioned arc welding, various types, such as plasma arc welding, covering arc welding, submerging arc welding, inert gas welding, MAG welding (includes carbon dioxide arc welding), and self shield arc welding, are admitted.

Figure 6:
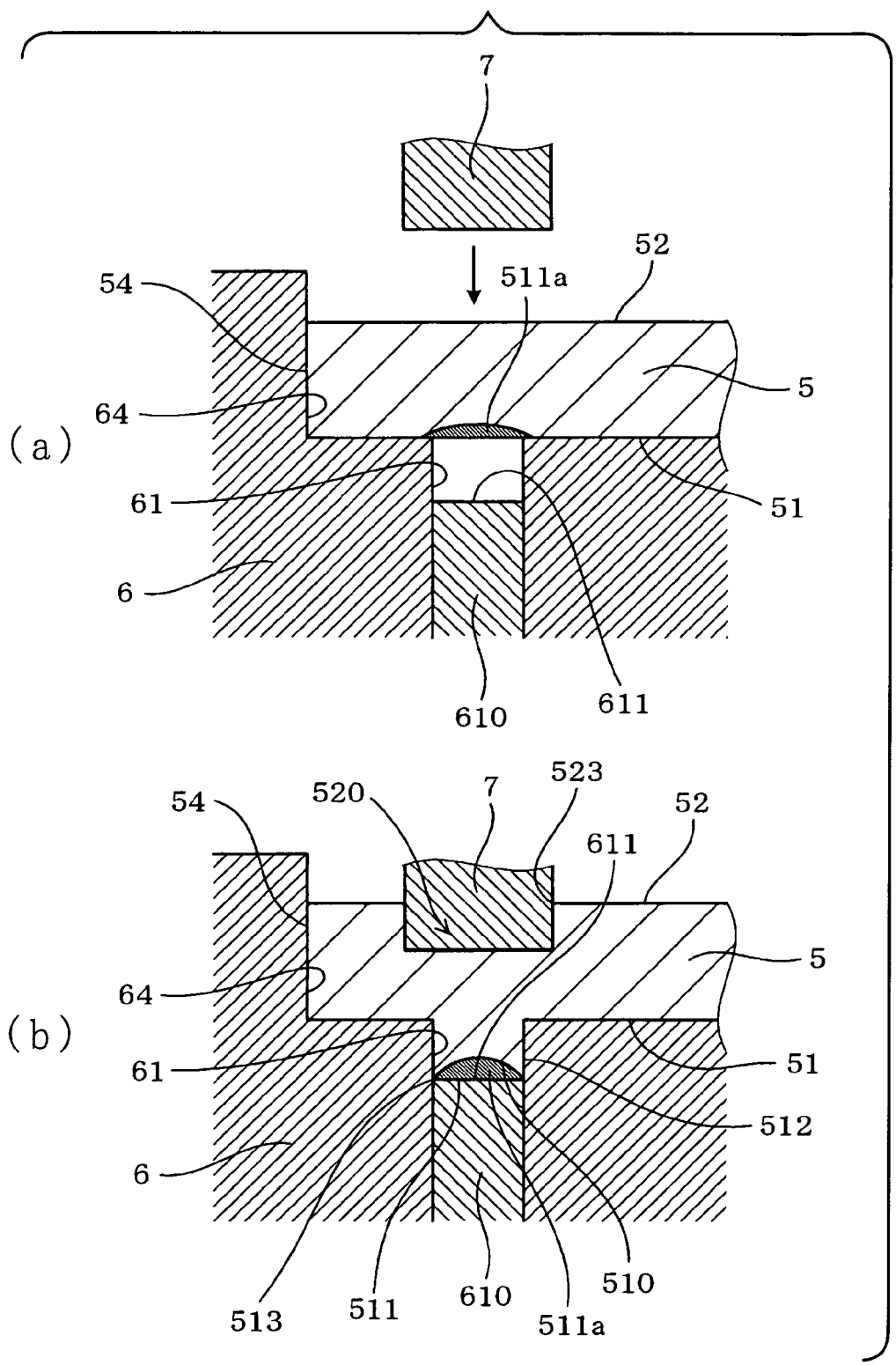
FIG. 6 shows sectional views of the state before forming the convex portion and a concave portion, and after forming the convex portion and the concave portion, respectively, in the first embodiment.

Subsequently, as shown in FIG. 6 (a), the above-mentioned ground electrode 5 is laid on a metal die 6 that has a pillar-shaped cavity 61 for convex portion for forming the convex portion 510. The ground electrode 5 is placed so that the opposing surface 51 faces the cavity 61 for convex portion.

At this time, the ground electrode 5 is laid on the metal die 6 in the state where the both side surfaces 53 in a width direction and the tip portion 54 contact the side-contacting surfaces 63 and the tip-contacting surface 64 that are formed in the metal die 6, as shown in the figures.

Further, a movable die 610 that is slidable to the cavity 61 is inserted to the metal die 6. The movable die 610 has its die surface 611, which faces the ground electrode 5, formed in a plane shape.

The amount of projection h of the convex portion 510 may be changed by adjusting the position of the movable die 610 in the cavity 61.

In addition, a pressing jig 7 has a pillar shape like the cavity 61 for convex portion, and a cross-section area of a section that intersects perpendicularly in the movable direction of the pressing jig 7 is constituted larger than a cross-section area of the cavity 61 so that the relation of S1>=s may be satisfied in the spark plug 1.

Further, the convex portion 510 is formed by giving cold forging processing to the plate-like ground electrode 5 using the above-mentioned metal die 6 and the above-mentioned pressing jig 7.

Figure 7:
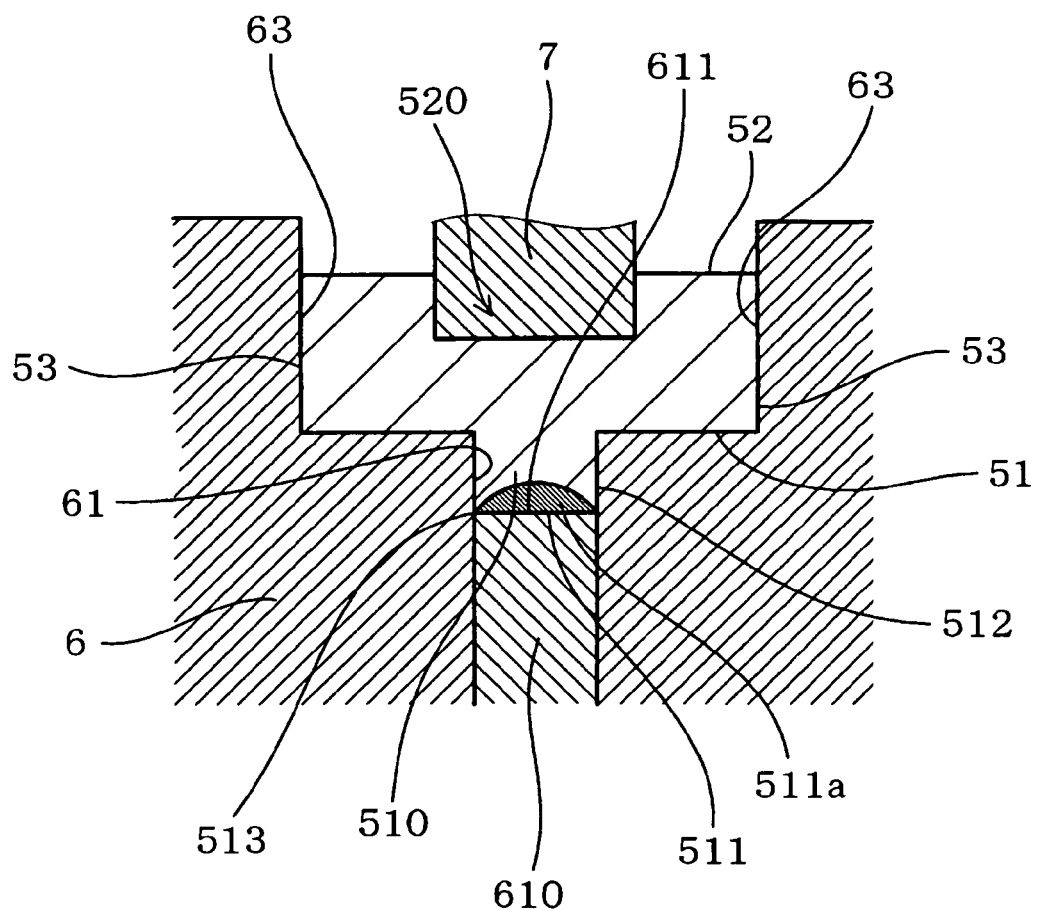
FIG. 7 shows a diagram of the state after forming the first convex portion and the concave portion in the first embodiment.

Specifically, as shown in FIG. 6 (b) and FIG. 7, the concave portion 520 is formed by pressing a part of a rearside 52 of the ground electrode 5 using the pressing jig 7, while the convex portion 510 is formed by pressing a part of the base materials of the ground electrode 5 toward the cavity 61 for convex portion using the pressing jig 7.

That is, a part of opposing surface 51 is pushed out, and a pushed out portion of the ground electrode 5 projects inside the cavity 61 to form the convex portion 510 that has the fusion solidification part 511a in the electric discharge surface 511 as mentioned above.

In addition, when pushing out the part of the rearside 52 of the ground electrode 5 with the pressing jig 7, the ground electrode 5 is pressed by the pressing jig 7 contacting with the above-mentioned side-contacting surfaces 63 and the above-mentioned tip-contacting surface 64, as shown in FIG. 6 (b). Therefore, the convex portion 510 may be made fully projected for the part pushed out from the opposing surface 51.

However, since all volume of the concave portion 520 pushed out by the pressing jig 7 may not become the convex portion 510 as mentioned above, it is preferred to form the section of the ground electrode 5 that intersects the ground electrode 5 perpendicularly in the axial direction into rectangle infinitely and have the ground electrode 5 fully contact with the side-contacting surfaces 63 and the tip-contacting surface 64.

In another words, according to the above-mentioned method, the volume of the concave portion 520 and the volume of the convex portion 510 can be brought equally close, thus the spark plug that satisfies the relation of H>=h may be constituted.

Further, the electric discharge surface 511 of the convex portion 510 is formed when the part of the ground electrode 5 contacts a die surface 611 of the movable die 610.

Subsequently, the ground electrode 5 that has been processed is released from the metal die 6 by pushing out the movable die 610 to the direction of the ground electrode 5, and pulling out the convex portion 510 from the cavity 61.

Next, as shown in FIGS. 8 (b) and (c), the ground electrode 5 is bent so that the electrode tip part 40 and the convex portion 510 may face each other. Thereby, the spark discharge gap G is formed between the electrode tip part 40 and the convex portion 510.

It should be appreciated that the spark plug 1 of the present embodiment is not restricted to the above-mentioned form.

Figure 10:
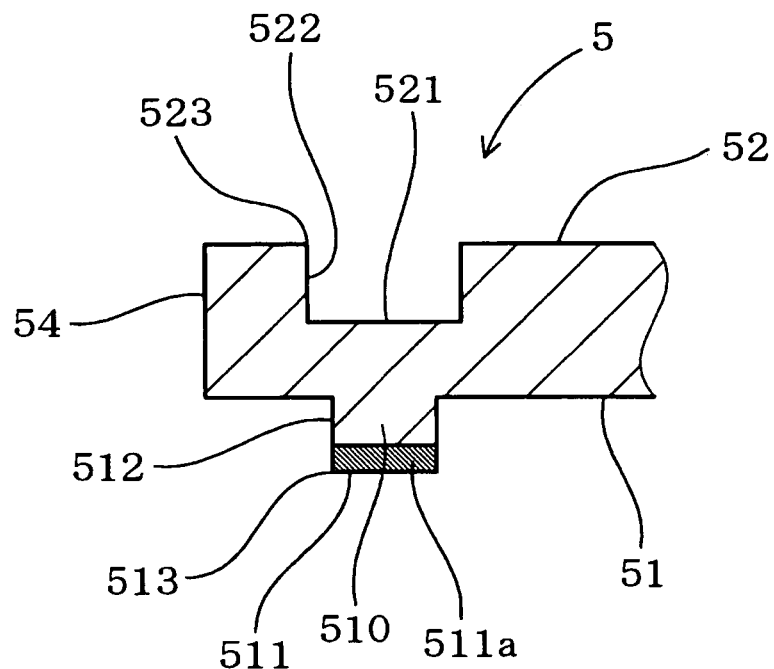
FIG. 10 shows a sectional view of the tip portion of the ground electrode that has the fusion solidification part in another form in the first embodiment.

That is, as shown in FIG. 10 for example, the fusion solidification part 511a may be formed not only in the electric discharge surface 511 but also in the corner portion 513 and the part of the side surface 512. In this case, wear of the corner portion 513 that is easy to be worn by electric discharge can fully be suppressed.

Figure 11:
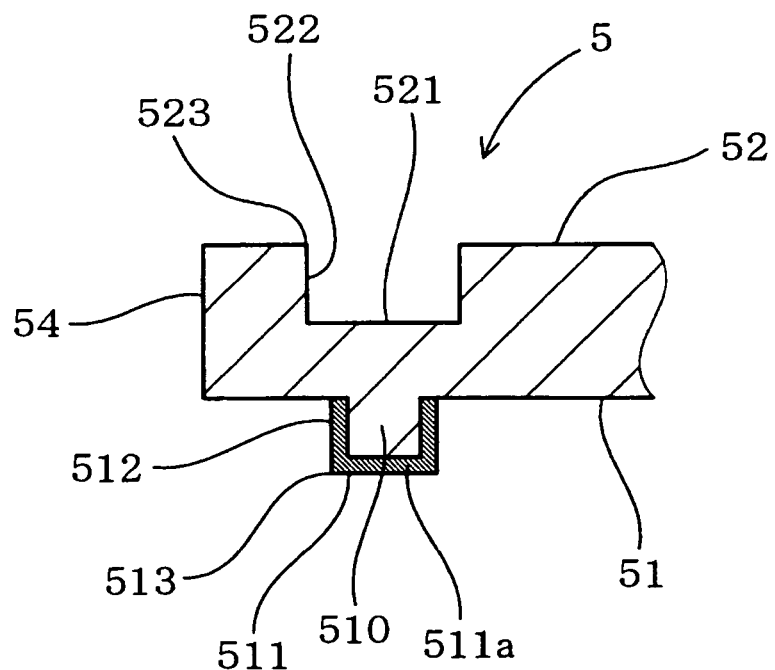
FIG. 11 shows a sectional view of the tip portion of the ground electrode that has the fusion solidification part in further another form in the first embodiment.

Further, as shown in FIG. 11, the fusion solidification part 511a can also be formed even in the electric discharge surface 511, the corner portion 513, and not only the side surface 512 but also the root part 514 of the convex portion 510. In this case, the wear of the corner portion 513 can fully be suppressed.

In addition, in the side surface 512 of the convex portion 510, since the boundary of the fusion solidification part 511a and the base material of the ground electrode 5 does not exist, faults, such as oxidization and a crack, and exfoliation of the fusion solidification part 511a, are fully avoidable in this case.

The operation and effect of the present embodiment is explained below.

The fusion solidification part 511a made of precious metals and the part of the base materials melted together and solidified is formed at least on the part of the electric discharge surface 511.

Thereby, the spark plug 1 for internal-combustion engines that offers excellence in durability and reliability in the joint portion at low cost is provided.

That is, since the precious metals itself melt into the base material itself, i.e., the interface of the part of the base materials of the ground electrode 5, the above-mentioned fusion solidification part 511a is formed in the present embodiment.

Thus, since the fusion solidification part 511a is formed integrally with the part of the base materials of the ground electrode 5 and is fully fit with other portions of the ground electrode 5, thermal conductivity is excellent and the temperature rise of the convex portion 510 is suppressed.

Since all the precious metals are melted into the part of the base materials of the ground electrode 5 unlike the former technology, the fault that the precious metals are worn does not occur. Consequently, the spark plug 1 excellent in durability may be obtained.

Further, since the precious metals fully melt into the base material of the ground electrode 5 to form the fusion solidification part 511a, cracks and the oxidization of the precious metals do not occur in the fusion solidification part 511a even if heat stress acts by a thermal cycle. For this reason, the reliability in the joint portion of the fusion solidification part 511a and the ground electrode 5 may be raised.

Furthermore, in order to lower demand voltage, what is necessary is just to increase the amount of projection of the convex portion 510, so that it is sufficient to use only a small amount of precious metals as compared with the former technology. Therefore, the cost of manufacturing the spark plug 1 may be lowered.

In addition, since the spark plug 1 of the present embodiment has the convex portion 510 that its electric discharge surface 511 is equipped with the fusion solidification part 511a as mentioned above, a flame core in the spark discharge gap G can be fully grown up. As a result, the spark plug 1 that is excellent in ability of igniting the spark plugs may be obtained.

Moreover, in the spark plug 1 of the present embodiment, since the fusion solidification part 511a is formed on the entire surface of the electric discharge surface 511, wear of the convex portion 510 is suppressed further.

That is, sparks tend to fly to the corner portion 513 formed between the side surface 512 of the convex portion 510 and the electric discharge surface 511 especially from the center electrode 4. Therefore, the fusion solidification part 511a may be arranged also to this part by the above-mentioned composition. Consequently, wear of the convex portion 510 may be suppressed further.

Further, the ground electrode 5 has the concave portion 520, and since the convex portion 510 is formed so that the extension of the axis M may pass through the area in which concave portion 520 is formed, the spark plug 1 of the present embodiment can be manufactured easily.

That is, the convex portion 510 may be formed at the same time when the concave portion 520 is formed by pressing the part of the rearside of the ground electrode 52 with the pressing jig 7 etc., for example.

Therefore, the convex portion 510 that has the fusion solidification part 511a may be formed easily in this case; as a result, the spark plug 1 of the present embodiment may be manufactured easily.

In the spark plug 1 of the present embodiment, when the area of the opening 523 of the concave portion 520 is set to S1, and the average cross-section area of the section of the convex portion 510 that intersects perpendicularly in the axial direction of the spark plug 1 is set to s, since the relation of S1>=s is satisfied, the spark plug 1 that is excellent in heat resistance may be obtained.

That is, although the convex portion 510 can be formed by projecting the part of the base materials of the ground electrode 5 onto the opposing surface 51 by forming the concave portion 520 by pushing out the part of the rearside of the ground electrode 52, the convex portion 510 can be fully projected even if the depth of the concave portion 520 is small, since there is a relation of S1>=s.

For this reason, route for heat radiation of the ground electrode 5 is also fully securable, since the thickness of the base material of the ground electrode 5 in the neighborhood of the concave portion 520 is fully securable. As a result, the spark plug 1 that is excellent in heat resistance may be obtained.

Further, in the spark plug 1 of the present embodiment, since S2>=s is satisfied when the average cross-section area of the section of the concave portion 520 that intersects perpendicularly in the axial direction is set to S2, the convex portion 510 may be fully projected even if the depth of the concave portion 520 is small. For this reason, the spark plug 1 that is excellent in productivity and heat resistance may be obtained.

In addition, in the spark plug 1 of the present embodiment, since the relation of H<=(3/4)T is satisfied with the thickness T of the ground electrode 5 and the depth H in the axial direction of a spark plug 1 of the concave portion 520, the thickness of the ground electrode 5 in the neighborhood of the concave portion 520 is fully securable. As a result, the spark plug 1 that is further excellent in heat resistance may be obtained.

Further, the convex portion 510 and the concave portion 520 are formed nearly in pillar shapes, and since when the diameter of the convex portion 510 is set to d, and the diameter of the concave portion 520 is set to D, the relation of D>=d is satisfied, the spark plug 1 that is excellent in productivity and heat resistance may be obtained.

Furthermore, in the spark plug 1 of the present embodiment, since the relation of H<=2h is satisfied when the amount of the projection of the convex portion 510 in the axial direction is set to h and the depth of concave the portion 520 in the axial direction is set to H, the convex portion 510 can be fully projected while the thickness of the ground electrode 5 in the neighborhood of the concave portion 520 is fully securable.

As a result, the spark plug 1 that is excellent in the ability of igniting spark plugs and heat resistance may be obtained.

Accordingly, in the present embodiment, the spark plug for internal-combustion engines that offers excellence in durability and reliability in the joint portion at low cost may be provided.

The Second Embodiment

The second embodiment is explained with reference to FIGS. 12-16. It should be appreciated that in this second embodiment and the embodiment hereafter, the same reference numbers are used for the same constituent factors as the spark plug given in the first embodiment mentioned above, and that explanation is omitted or simplified.

The second embodiment, as shown in FIGS. 12-16, is an example regarding the spark plug 1 that has a different form from the above-mentioned first embodiment, and method of manufacturing it.

Figure 16:
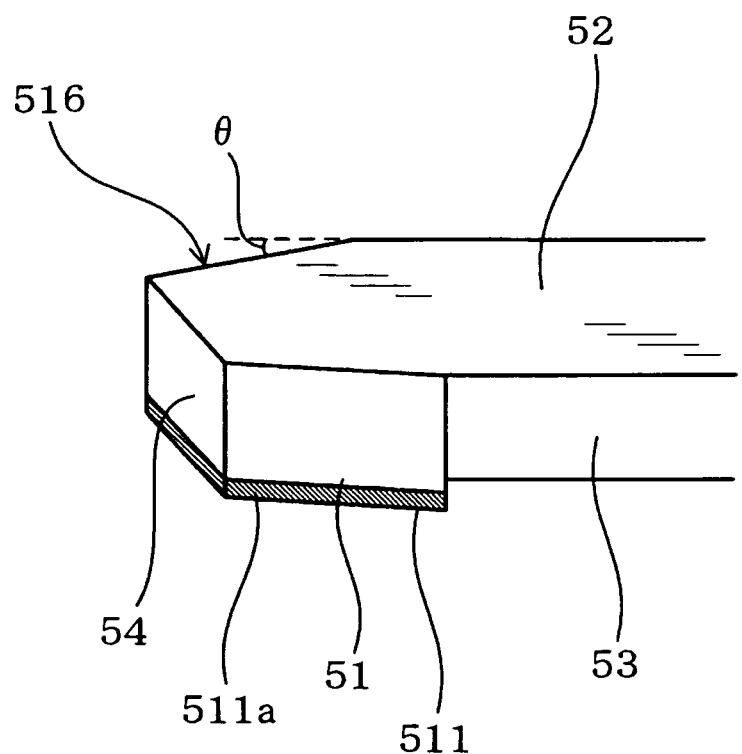
FIG. 16 shows a perspective view of a tip portion of the ground electrode in the second embodiment.

The ground electrode 5 of the spark plug 1 in the present embodiment has a taper part 516 formed so that width becomes narrower as its tip portion nears a tip side, as shown in FIG. 16.

Moreover, the convex portion 510 having the same shape with the taper part 516 is formed in the opposing surface 51 side of the taper part 516. The taper angle (refer to θ in FIG. 16) of the taper part 516 may be designed into 12.5-45 degrees.

Within this range, the convex portion 510 that is excellent in the ability of forming, and has sufficient amount of projection may be formed easily. In the present embodiment, the fusion solidification part 511a is formed on the entire surface of the electric discharge surface 510 like that of the first embodiment as well.

On the other hand, in the present embodiment, the concave portion (reference number 520 in FIG. 1) is not formed unlike the first embodiment.

Next, the manufacturing procedure of the spark plug 1 of the present embodiment is explained.

That is, in the present embodiment, precious metals and the part of the base materials of the ground electrode 5 are melted together by arc welding slightly larger in the area than the area intended for the electric discharge surface 511 on the convex portion 510, then the melted portion is solidified afterwards.

Figure 12:
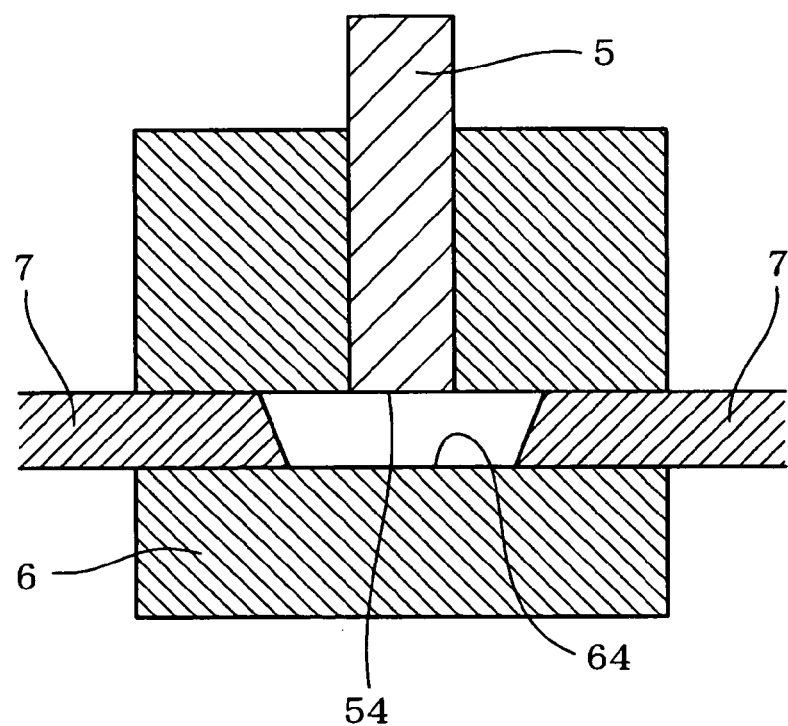
FIG. 12 shows an upper surface view of a state before forming a convex portion in a ground electrode in a second embodiment of the present invention.
Figure 13:
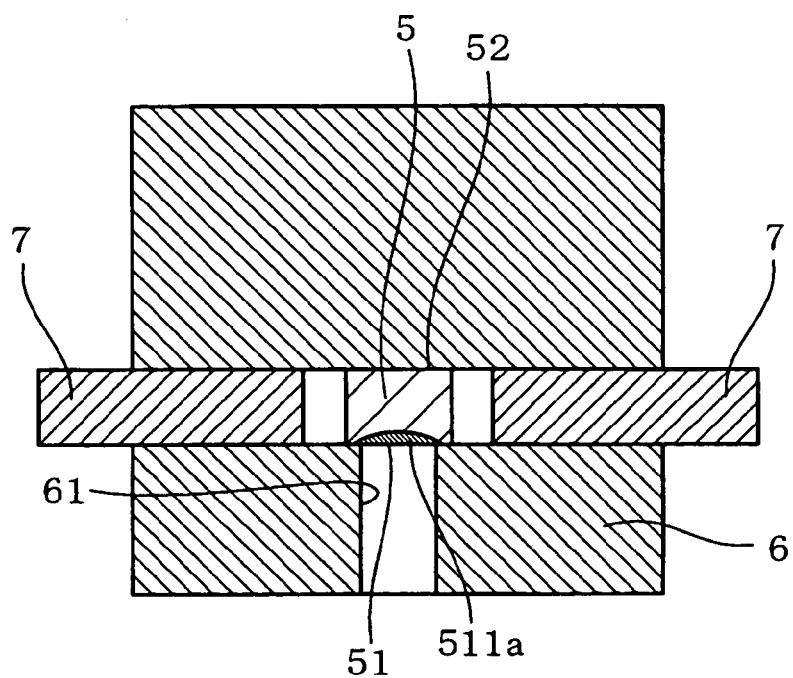
FIG. 13 shows an elevational view of the state before forming the convex portion in the ground electrode in the second embodiment.
Figure 14:
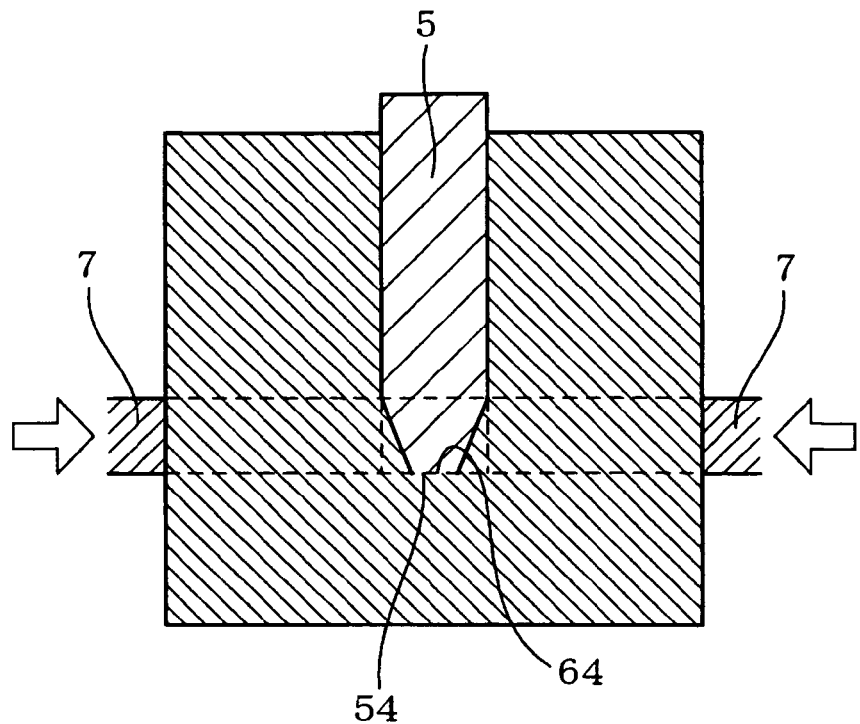
FIG. 14 shows the upper surface view of the state of forming the convex portion in the ground electrode in the second embodiment.
Figure 15:
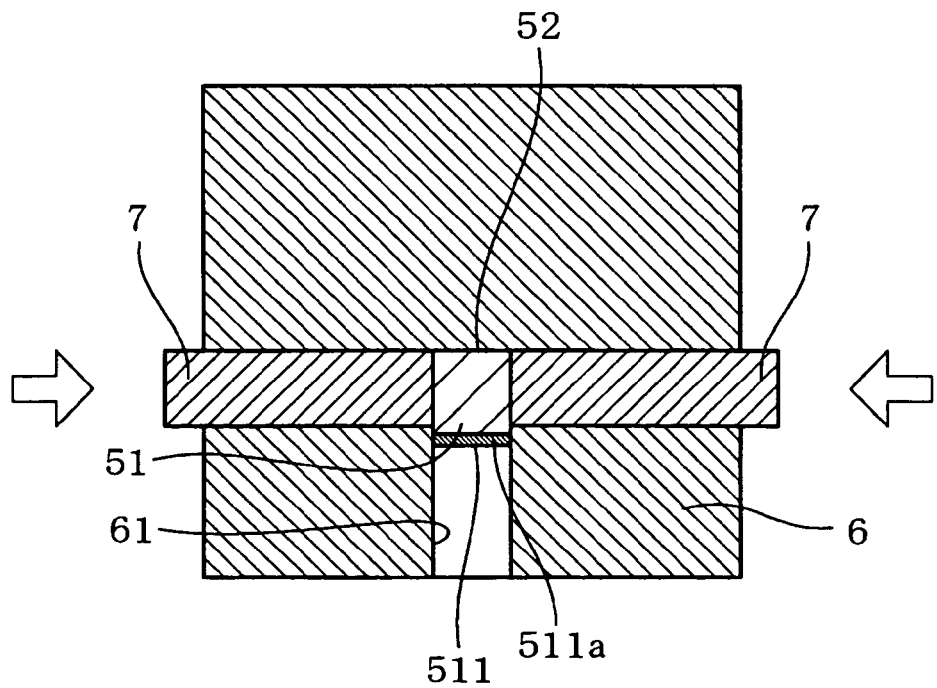
FIG. 15 shows the elevational view e of the state of forming the convex portion in the ground electrode in the second embodiment.

Subsequently, as shown in FIGS. 12 and 14, the base material of the ground electrode 5 is positioned on the metal die 6 that has cavity 61 for convex portion, as shown in FIGS. 13 and 15, in the state where cavity 61 and the opposing surface 51 face each other.

Next, as shown in FIGS. 13 and 15, the tip portion of the base material of the ground electrode 5 is pressed with a pair of pressing jigs 7 from the both directions that intersects perpendicularly to the axial direction of the base material of the ground electrode 5.

The pair of the pressing jigs 7 has the taper form and has the same taper angle as the taper angle θ of the taper part 516. This may produce the spark plug 1 with the ground electrode 5 that has the form shown in FIG. 16.

Further, this embodiment has the same operation and effect as the first embodiment.

The Third Embodiment

The third embodiment is explained with reference to FIG. 17.

Figure 17:
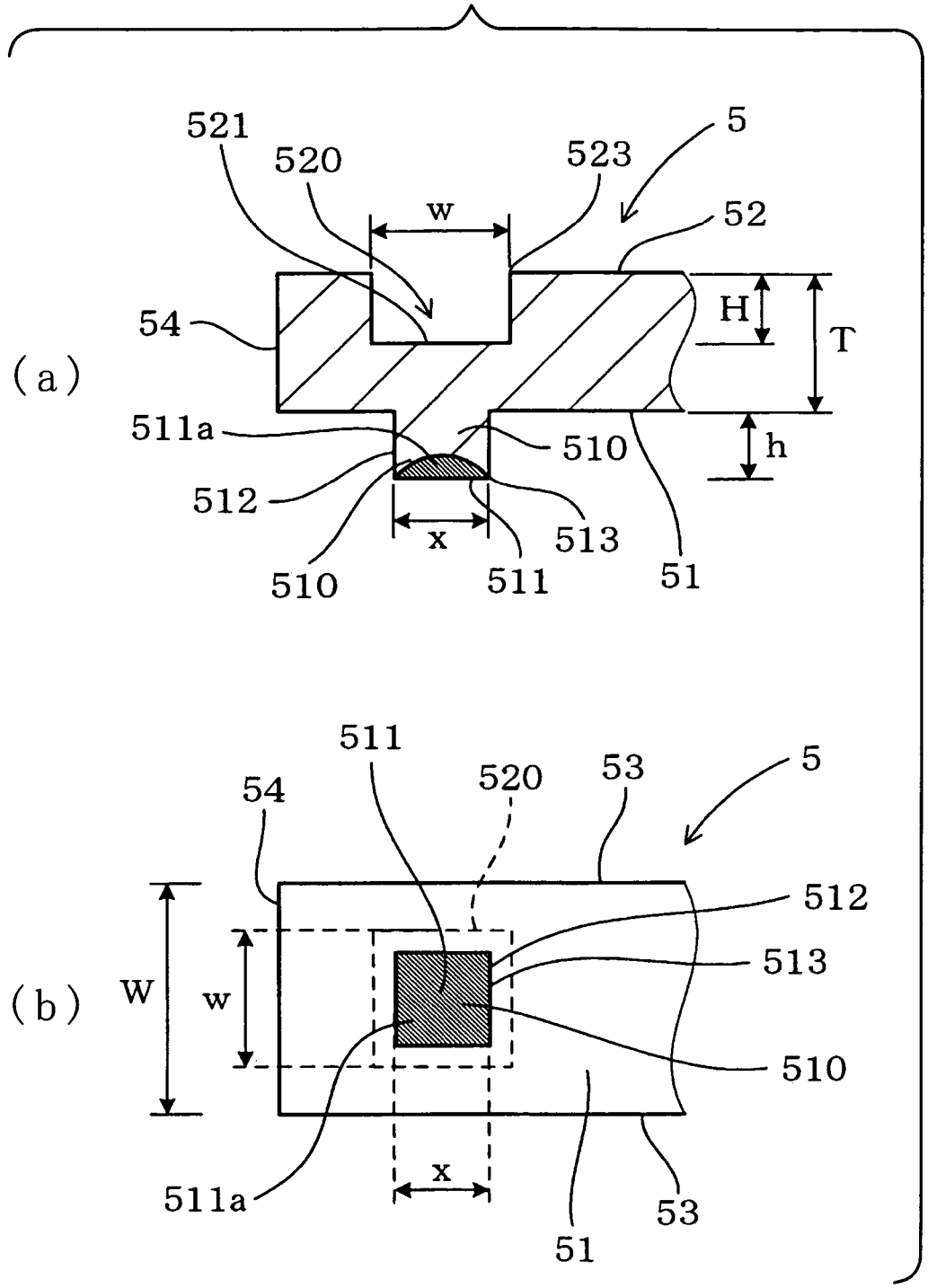
FIG. 17 shows a sectional view of the a portion of a ground electrode, and an upper surface view of the tip portion of the ground electrode, respectively, in a third embodiment of the present invention.

The third embodiment, as shown in FIG. 17, is an example of the ground electrode 5 that has the convex portion 510 and the concave portion 520 with near square pole shapes.

That is, the ground electrode 5 of the present embodiment is manufactured by using the metal die 6 that has cavity 61 for convex portion and the pressing jig 7, both in near square pole shape.

In the spark plug 1 of the present embodiment, when a cross-section area of a section of the convex portion 510 that intersects perpendicularly in an axial direction of the spark plug 1 is set to a and a cross-section area of a section of the concave portion 520 that intersects perpendicularly in an axial direction of the spark plug 1 is set to A, the relation of A>=a is satisfied.

Here, when seeing the convex portion 510 and concave portion 520 from the axial direction of the spark plug 1, both have squares-like shapes. That is, a length x of a side of the convex portion 510 and a length w of a side of the concave portion 520 have the relation of w>x. In addition, the length w of the side of the concave portion 520 and the width W of the ground electrode 5 has the relation of W>w.

Further, in the present embodiment, the fusion solidification part 511a is formed on entire surface of the electric discharge surface 510 like the first embodiment.

Furthermore, this embodiment has the same composition, operation and effect as the first embodiment.

The Fourth Embodiment

The fourth embodiment is explained with reference to FIG. 18.

Figure 18:
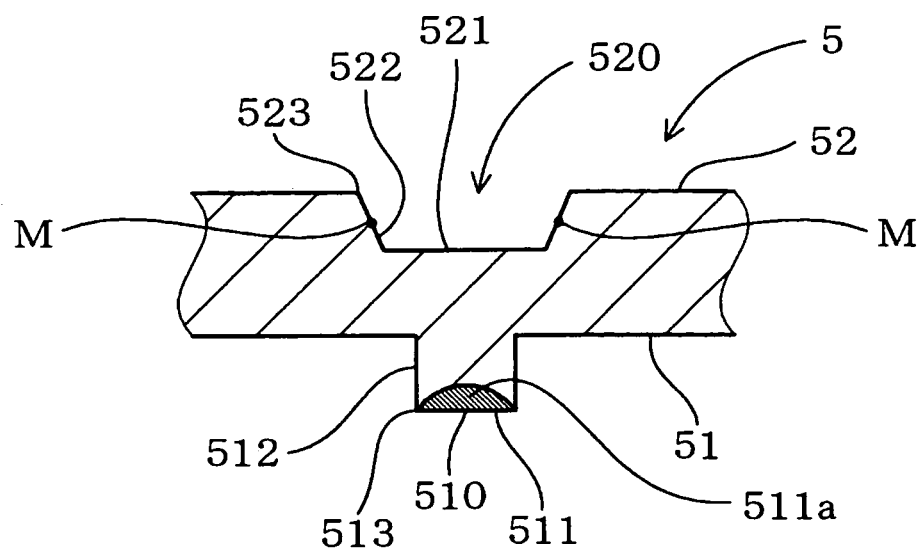
FIG. 18 shows a sectional view of a ground electrode in a fourth embodiment of the present invention.

This fourth embodiment, as shown in FIG. 18, is an example of the ground electrode 5 that has the convex portion 510 whose section is rectangle-like shape when cut in parallel with the axial direction of the ground electrode 5, and the concave portion 520 whose section is trapezoid-like shape when cut in parallel with the axial direction of the ground electrode 5.

That is, in the concave portion 520, two outlines of the side 522 of the concave portion 520 that appears in the section when cutting in parallel with the axial direction of the ground electrode 5 is tapered such that as the two outlines go to the opposing surface 51 side from the rearside of the ground electrode 52, and the average cross-section area S2 of the concave portion 520 becomes small.

In addition, when the ground electrode 5 of the present embodiment is seen in the axial direction of the spark plug 1, the area of the bottom part 521 of the concave portion 520 is smaller than the area of the opening 523 of the concave portion 520.

In the present embodiment, as shown in FIG. 18, the area S1 of the opening 523 of the concave portion 520 is larger than the area s of the convex portion 510. The average cross-section area S2 of the concave portion 520 is also larger than the area s of the convex portion 510.

Here, the average cross-section area S2 of the concave portion 520, V/H, is obtained by dividing the volume V of the concave portion 520 by the depth H of the concave portion 520.

Further, in the present embodiment, the fusion solidification part 511a is formed on entire surface of the electric discharge surface 510 like the first embodiment.

Furthermore, this embodiment has the same composition, operation and effect as the first embodiment.

The Fifth Embodiment

The fifth embodiment is explained with reference to FIG. 19.

Figure 19:
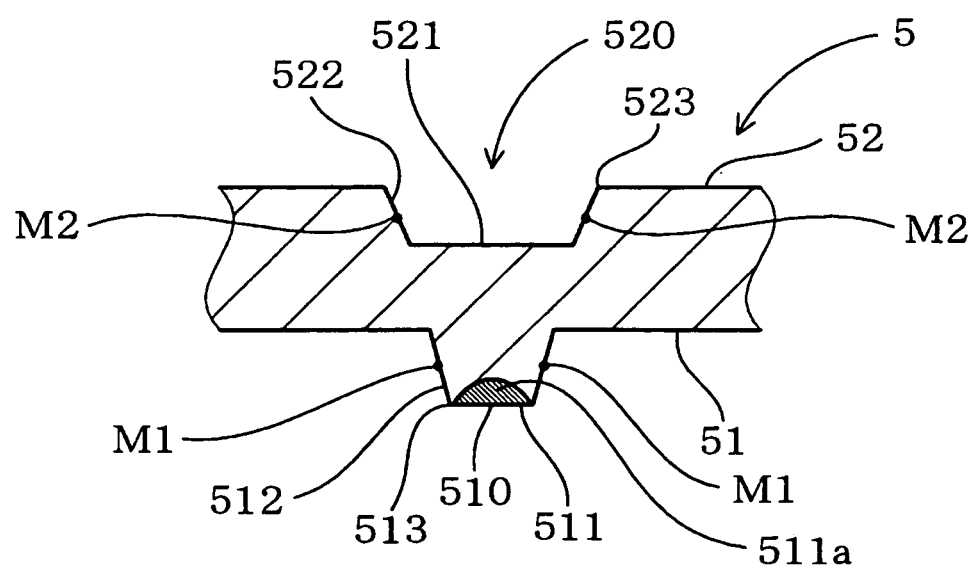
FIG. 19 shows a sectional view of a ground electrode in a fifth embodiment of the present invention.

This fifth embodiment, as shown in FIG. 19, is an example of the ground electrode 5 that has the convex portion 510 and the concave portion 520 whose sections are trapezoid-like shapes when cut in parallel with the axial direction of the ground electrode In the present embodiment, the area S1 of the opening 523 of the concave portion 520 is larger than the average cross-section area s of the convex portion 510. The average cross-section area S2 of the concave portion 520 is also larger than the area s of the convex portion 510.

Here, the average cross-section area s of the convex portion 510 is v/h, where a value that the volume v of the convex portion 510 is divided by the amount of projection h. In addition, the average cross-section area S2 of the concave portion 520 is V/H, where a value that the volume V of the concave portion 520 is divided by the depth H of the concave portion 520.

Further, in the present embodiment, the fusion solidification part 511a is formed on entire surface of the electric discharge surface 510 like the first embodiment.

Furthermore, this embodiment has the same composition, operation and effect as the first embodiment.

The Sixth Embodiment

The sixth embodiment is explained with reference to FIG. 20.

Figure 20:
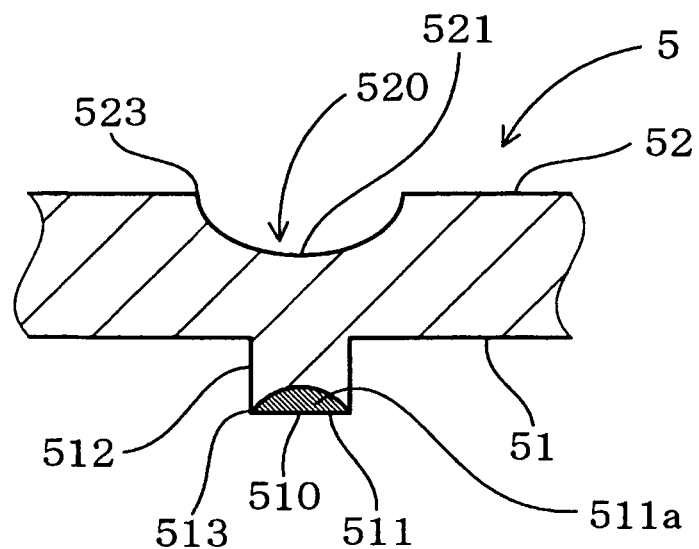
FIG. 20 shows a sectional view of a ground electrode in a sixth embodiment of the present invention.

This sixth embodiment, as shown in FIG. 20, is an example of the ground electrode 5 that has the convex portion 510 whose section is rectangle-like shape when cut in parallel with the axial direction of the ground electrode 5, and the concave portion 520 whose section is half-ellipse arc shape when cut in parallel with the axial direction of the ground electrode 5.

In the present embodiment, the area S1 of the opening 523 of the concave portion 520 is larger than the area s of the convex portion 510. The average cross-section area S2 of the concave portion 520 is also larger than the area s of the convex portion 510.

Here, the average cross-section area S2 of the concave portion 520 is the average value of the cross-section area of the concave portion 520 in the section of the direction that intersects perpendicularly in the axial direction from the opening 523 of the concave portion 520 to the bottom part 521.

Further, in the present embodiment, the fusion solidification part 511a is formed on entire surface of the electric discharge surface 510 like the first embodiment.

Furthermore, this embodiment has the same composition, operation and effect as the first embodiment.

The Seventh Embodiment

The seventh embodiment is explained with reference to FIGS. 21-23.

Figure 21:
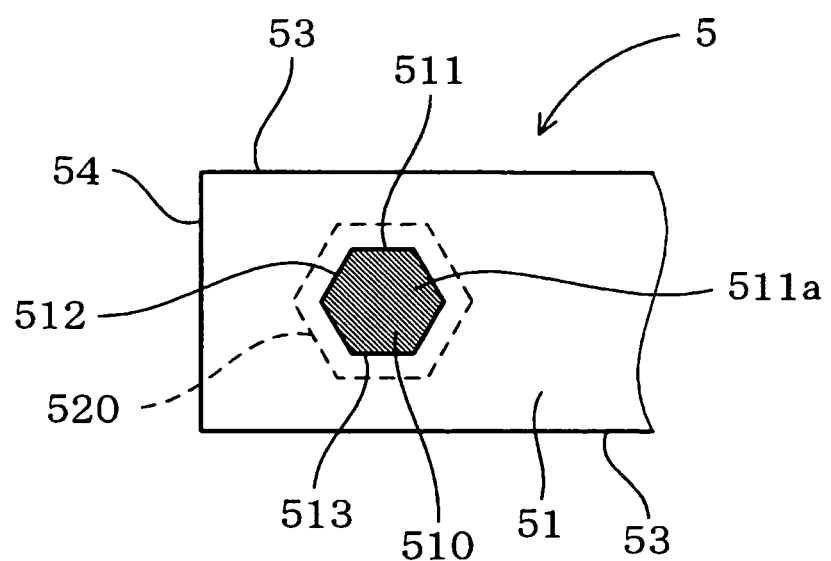
FIG. 21 shows a plane view of a ground electrode in a seventh embodiment of the present invention.
Figure 22:
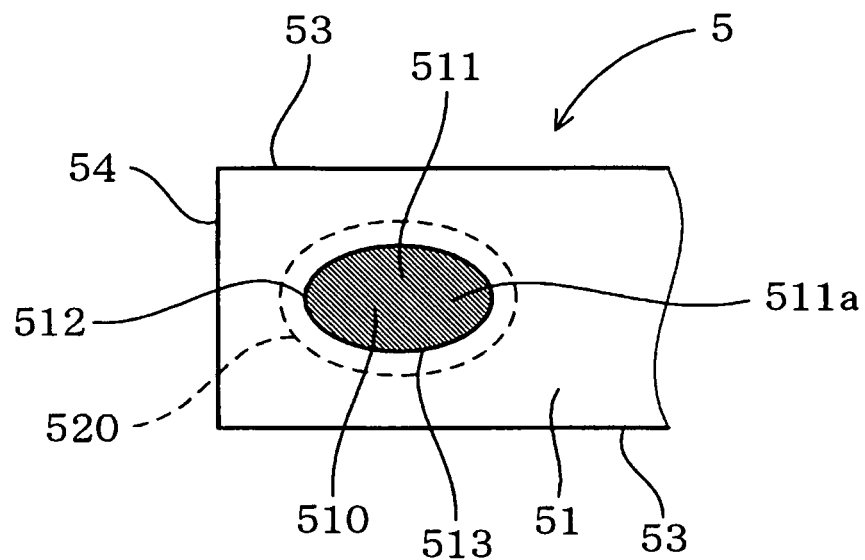
FIG. 22 shows a plane view of the ground electrode in another form in the seventh embodiment.
Figure 23:
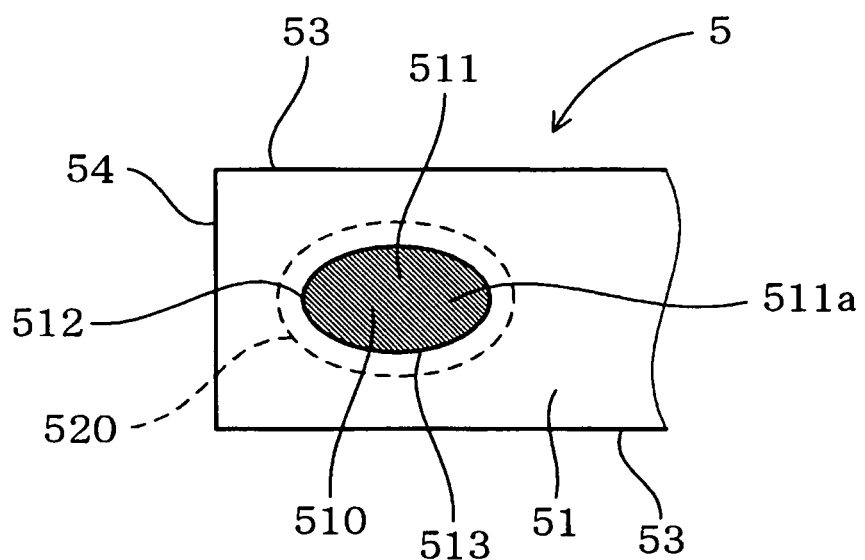
FIG. 23 shows a plane view of the ground electrode in further another form in the seventh embodiment.

This seventh embodiment, as shown in FIGS. 21-23, is an example of the ground electrode 5 with which the convex portion 510 and concave portion 520 have various forms.

The ground electrode 5 shown in FIG. 21 has the convex portion 510 and the concave portion 520 both having hexhead pillar shapes.

In addition, the ground electrode 5 shown in FIG. 22 has the convex portion 510 and the concave portion 520 both having elliptic cylinder shapes.

Further, the ground electrode 5 shown in FIG. 23 has the convex portion 510 and the concave portion 520 with near square pole shapes shown in the third embodiment. The convex portion 510 and the concave portion 520 are rotated approximately 45 degrees centering on the axial direction of the spark plug.

Thus, although there are various forms of the convex portion 510 and the concave portion 520, they have the same compositions as the first embodiment in these cases except for the form of the convex portion 510 and the concave portion 520.

That is, in the present embodiment, the fusion solidification part 511a is formed on entire surface of the electric discharge surface 510 like the first embodiment.

Further, this embodiment has the same operation and effect as the first embodiment.

The Eighth Embodiment

The eighth embodiment is explained with reference to FIGS. 24 and 25.

Figure 24:
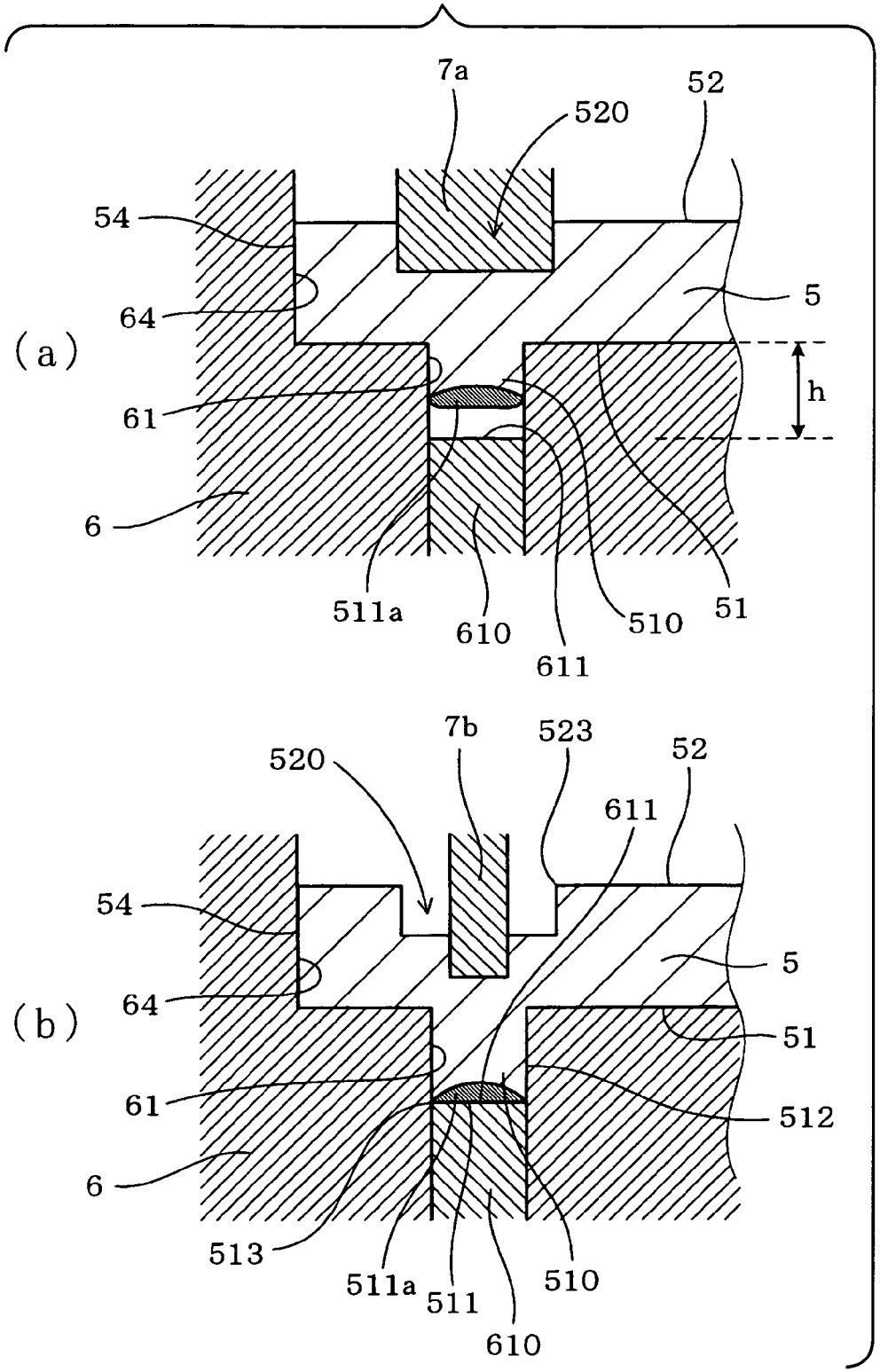
FIG. 24 shows a sectional view in a state where a part of a back of a ground electrode is pressed with a pressing jig having the same diameter as an opening of a concave portion, and in a state where the rearside of the ground electrode is pressed with the pressing jig having the diameter smaller than that of the convex portion, respectively, in an eighth embodiment of the present invention.
Figure 25:
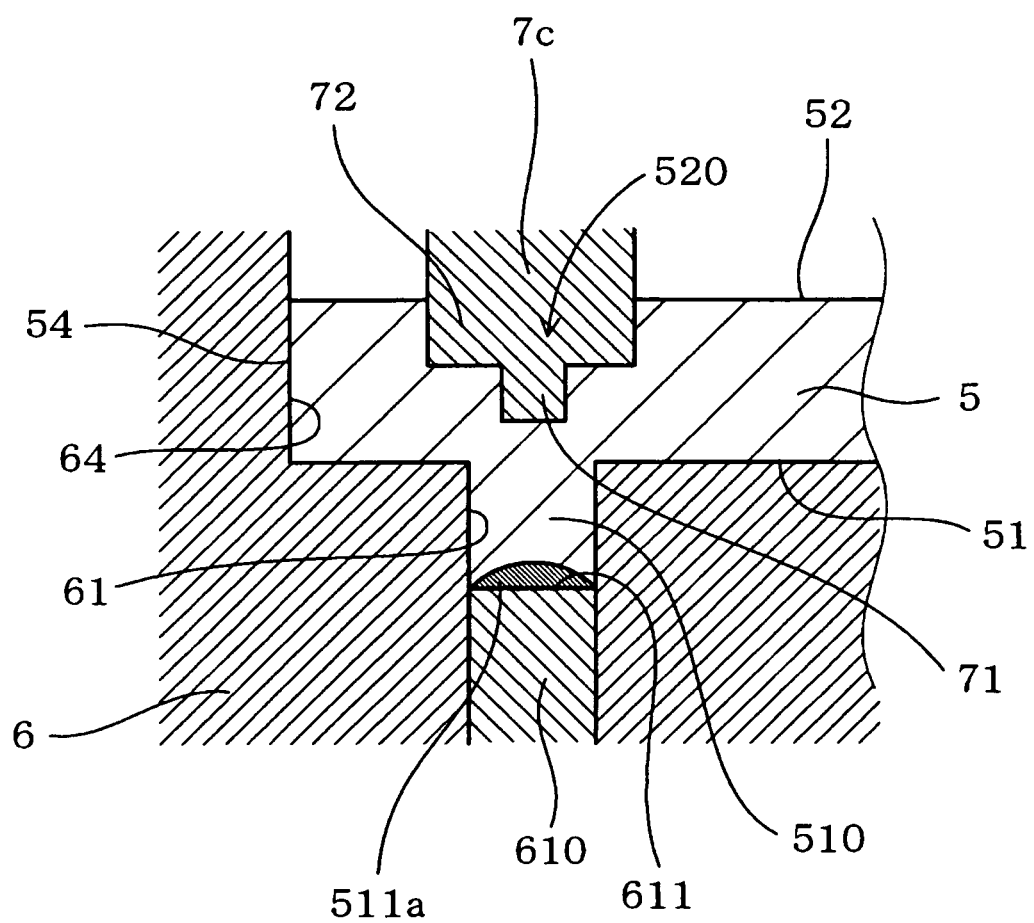
FIG. 25 shows a sectional view of the pressing jig in another form in the eighth embodiment.

This eighth embodiment, as shown in FIGS. 24 and 25, is a modification of the pressing process that presses the part of the rearside of the ground electrode 52 to form the convex portion 510 with the pressing jig 7.

That is, FIG. 24 shows the state where the above-mentioned pressing process is performed twice. Moreover, as shown in FIG. 24 (*a*), the convex portion 510 is formed using pressing jig 7a that has the same diameter as the diameter of the opening 523 of the concave portion 520 in the first pressing process.

Subsequently, as shown in FIG. 24 (*b*), the convex portion 510 is made to project further in the second pressing process using pressing jig 7b that has a diameter smaller than the diameter of the convex portion 510.

In the case of the present embodiment, the corner portion 513 may be formed surely at the convex portion 510.

FIG. 25 shows the state where pressing jig 7c that has pressing parts 71 and 72 having different diameters mutually is performing the pressing process.

Specifically, as shown in FIG. 25, the pressing jig 7c has the pressing part 71 that is arranged in the tip side of the pressing direction and has a diameter smaller than the diameter of the convex portion 510, and the pressing part 72 that has a diameter smaller than the diameter of the opening 523 of the concave portion 520. The pressing part 72 is extended in an opposite direction of the pressing direction from its back end part.

In this case, the corner portion 513 may be formed surely at the convex portion 510 like the case where it is shown in the above-mentioned FIG. 24.

Further, this embodiment has the same operation and effect as the first embodiment.

The Ninth Embodiment

The ninth embodiment is explained with reference to FIG. 26.

Figure 26:
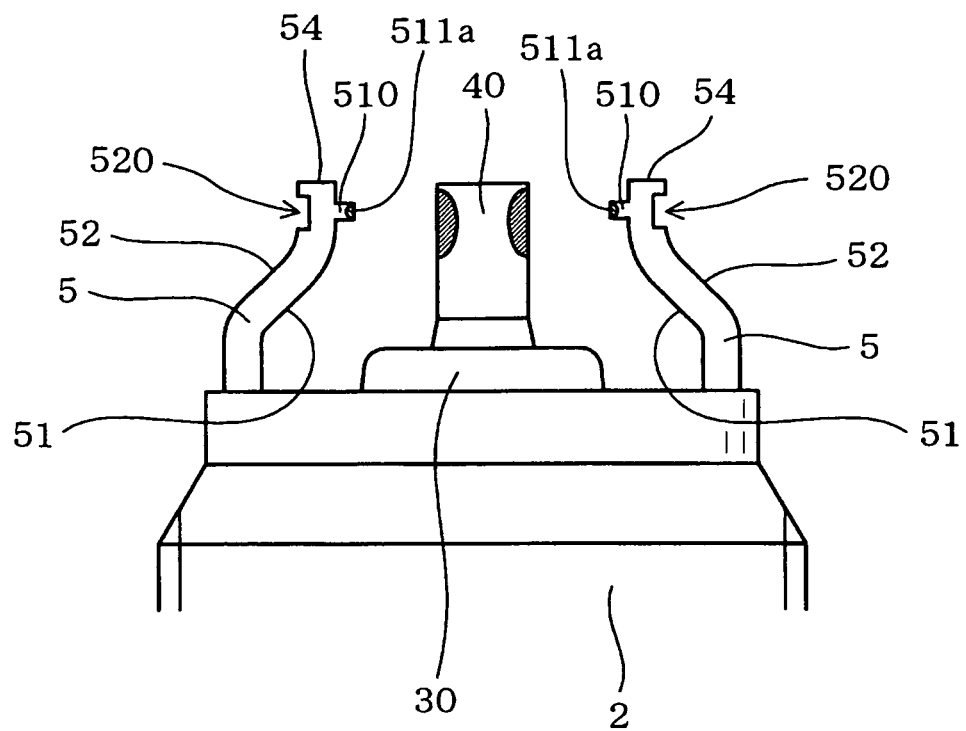
FIG. 26 shows a side view of a tip portion of a multi-electrode type spark plug in a ninth embodiment of the present invention.

This ninth embodiment, as shown in FIG. 26, is an example of the multi-electrode type spark plug 1 that has two ground electrodes 5. That is, the spark plug 1 of the present embodiment is provided with two ground electrodes 5 that have the convex portions 510.

Specifically, two ground electrodes 5 are attached in the mount fitting 2 so that the electric discharge surface 511 in each convex portion 510 may face each other on both sides of the center electrode 4. Further, each convex portion 510 is projected toward the tip part of the center electrode 4.

Furthermore, in the present embodiment, the fusion solidification part 511a is formed on entire surface of the electric discharge surface 510 like the first embodiment.

In the case of the present embodiment, the spark plug 1 that is excellent in ability of igniting the spark plugs may be obtained.

Further, this embodiment has the same operation and effect as the first embodiment.

The Tenth Embodiment

The tenth embodiment is explained with reference to FIG. 27.

Figure 27:
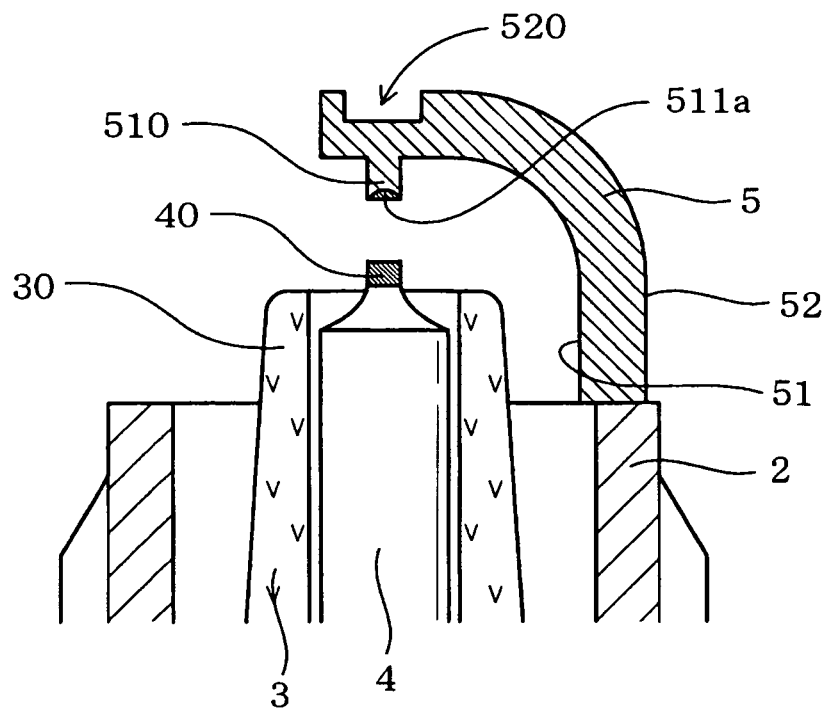
FIG. 27 shows a sectional view of a tip portion of a spark plug in a tenth embodiment of the present invention.

This tenth embodiment, as shown in FIG. 27, is an example of the spark plug 1 constituted so that only the electrode tip part 40 attached in the tip part of the center electrode 4 is located in the tip side of the axial direction of the spark plug 1 rather than the insulator tip part 30 of the porcelain insulator 3.

Furthermore, in the present embodiment, the fusion solidification part 511a is formed on entire surface of the electric discharge surface 510 like the first embodiment.

In the case of the present embodiment, the spark plug 1 that can reduce the demand voltage may be obtained while securing the outstanding sputter-proof nature.

Further, this embodiment has the same operation and effect as the first embodiment.

The Eleventh Embodiment

The eleventh embodiment is explained with reference to FIGS. 28 and 29.

Figure 28:
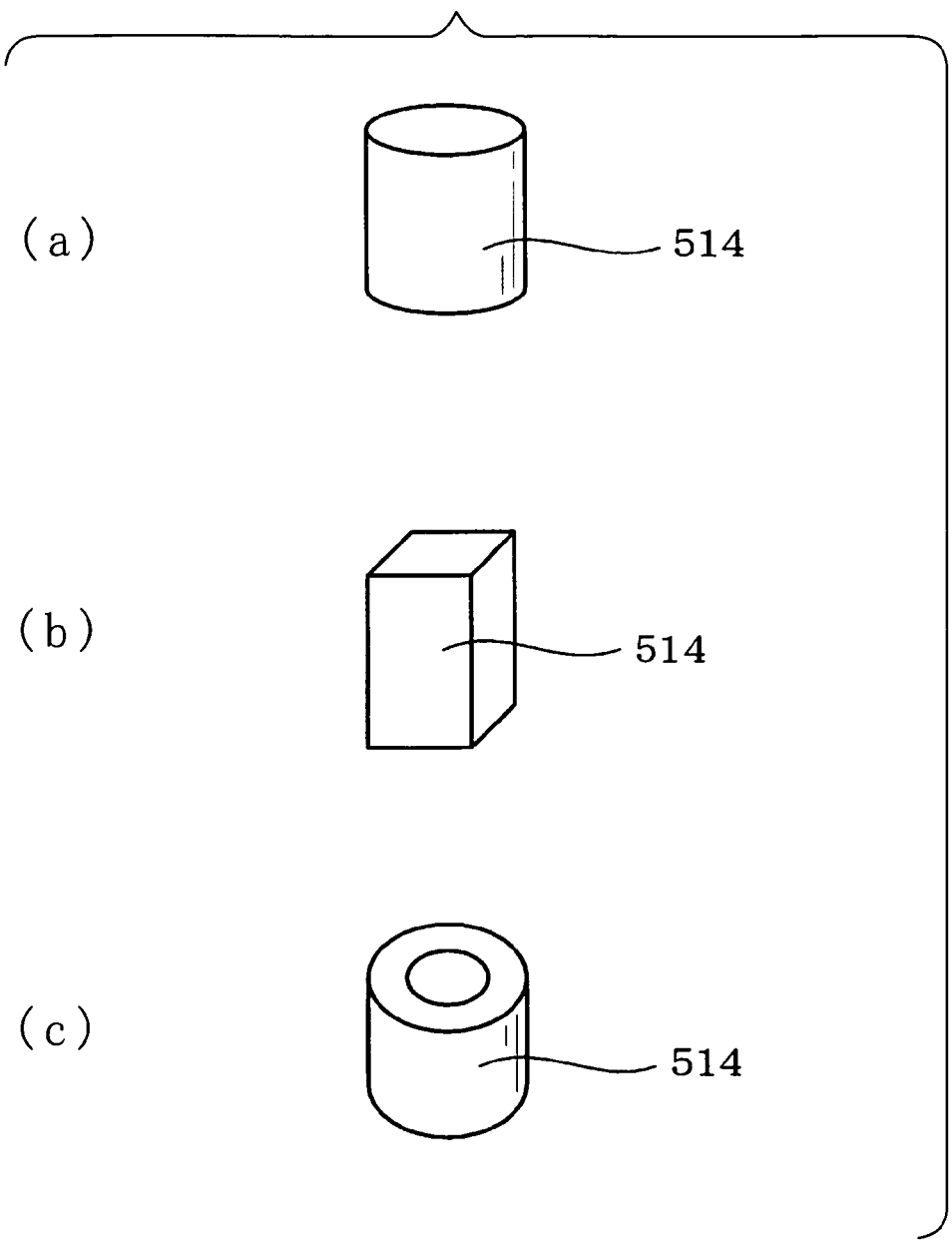
FIG. 28 shows perspective view of chips attached to the electric discharge surface of the convex portion in a pillar form, in a square pillar form, and in an annular form, respectively, in an eleventh embodiment of the present invention.
Figure 29:
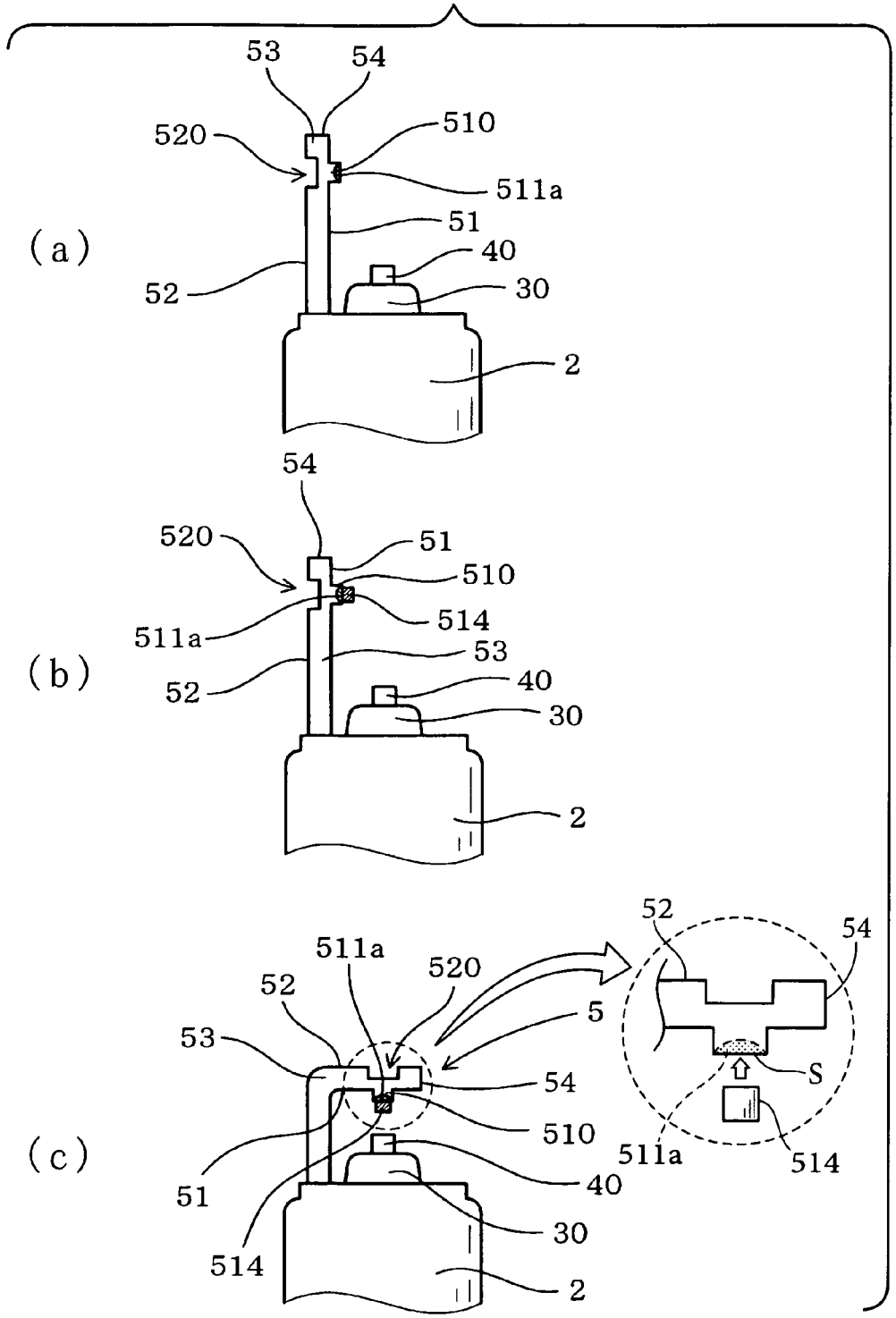
FIG. 29 shows side views of a state where the convex portion is formed, a state where the chip is welded to the electric discharge surface of the convex portion, and a state where the ground electrode is bent, respectively, in the eleventh embodiment.

This eleventh embodiment, as shown in FIGS. 28 and 29, is an example of the spark plug 1 that has the ground electrode 5 having the chip 514 welded that includes the precious metals further to the surface s of the fusion solidification part 511a allotted on the entire surface of the electric discharge surface 511.

As a chip 514, one or more precious metals with any one of Pt, Ir, Rh or W, for example, may be used.

The chip 514 may be in the pillar form as shown in FIG. 28 (a), in the rectangular parallelepiped form as shown in FIG. 28 (b), and in the annular form as shown in FIG. 28 (c). The chip 514 may be formed changing its height variously according to the required amount of projection h of the convex portion 510.

The manufacturing procedure of the spark plug 1 of the present embodiment is explained with FIG. 29.

That is, as shown in FIG. 29 (a), after forming the fusion solidification part 511a in the position where the electric discharge surface 511 is formed, the convex portion 510 is formed by pressing the part of the base materials of the ground electrode 5 with the pressing jig 7, like the above-mentioned first embodiment.

Next, as shown in FIG. 29 (b), the chip 514 is welded to the tip part of the convex portion 510 by resistance welding. When the chip 514 is long, resistance welding and laser welding may be used together in order to raise the reliability of welding.

Subsequently, as shown in FIG. 29 (c), the ground electrode 5 is bent so that the chip 514 and the convex portion 510 that include the precious metals may face with the electrode tip part 40 of the center electrode 4

The spark plug 1 of the present embodiment can be manufactured with the above-mentioned procedure.

When attaching the chip 514 including the precious metals further on the electric discharge surface 511 of the convex portion 510 like the present embodiment, even if in the case where the amount of projection h from the opposing surface 51 is made the same, quantity of the precious metals used only the part in which the convex portion 510 is formed for the ground electrode 5 may be lessened rather than the case where the chip 514 is only attached in the opposing surface 51.

For this reason, the material cost of the spark plug 1 may be reduced. In addition, since the chip 514 is attached in the direction that approaches the electrode tip part 40 further rather than the electric discharge surface 511 of the convex portion 510, demand voltage may be reduced compare with the case of only having the convex portion 510 formed, thus the ability of igniting the spark plug 1 may be raised.

Further, the heat stress that acts from the base material of the ground electrode 5 to the chip 514 may be eased by the fusion solidification part 511a, thus the reliability in joint of the chip 514 and the ground electrode 5 may be raised.

Further, this embodiment has the same operation and effect as the first embodiment.

The Twelfth Embodiment

The twelfth embodiment is explained with reference to FIGS. 30 and 31.

Figure 30:
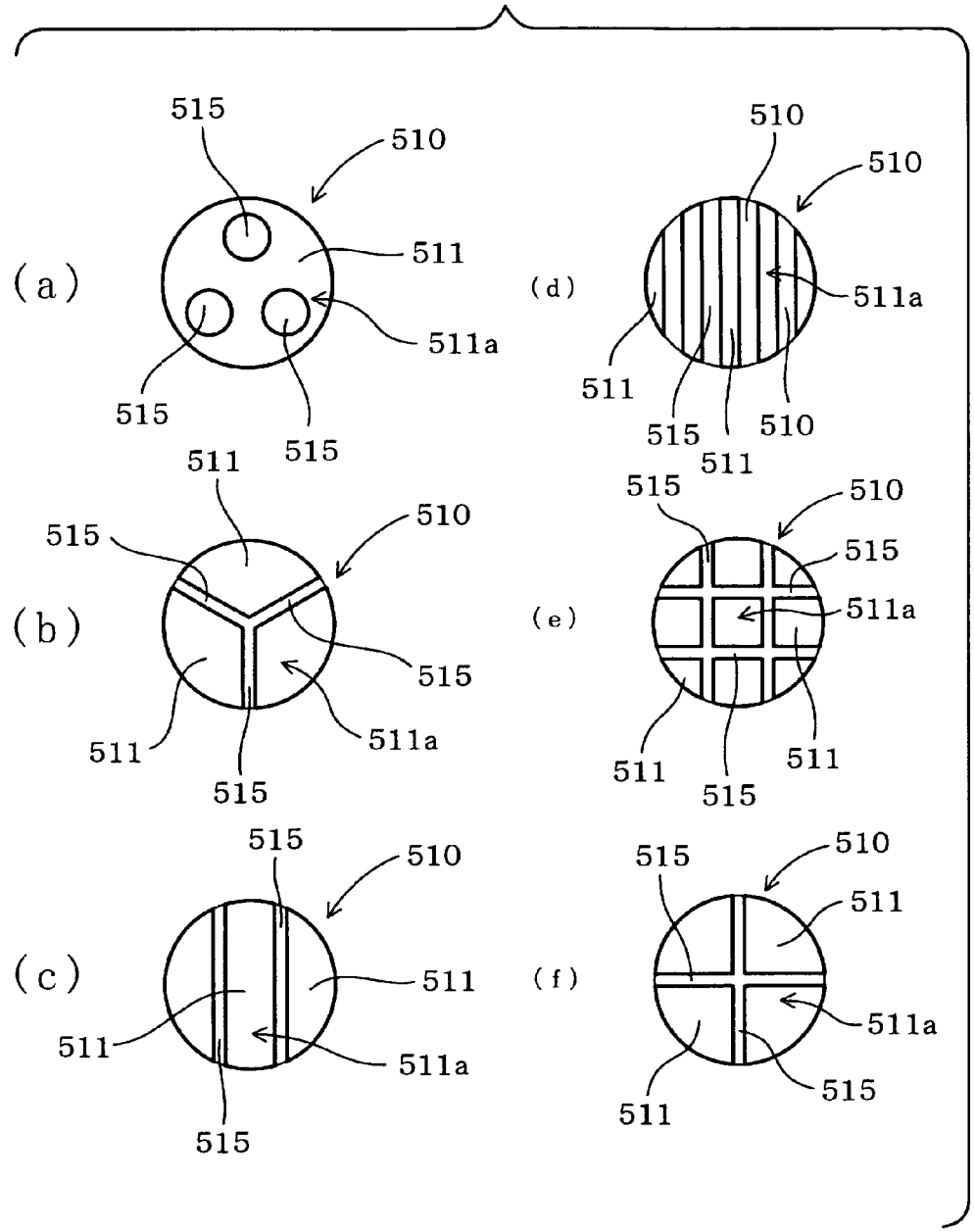
FIG. 30 shows various plane views of slots formed on the electric discharge surfaces of the convex portions in the twelfth embodiment of the present invention.
Figure 31:
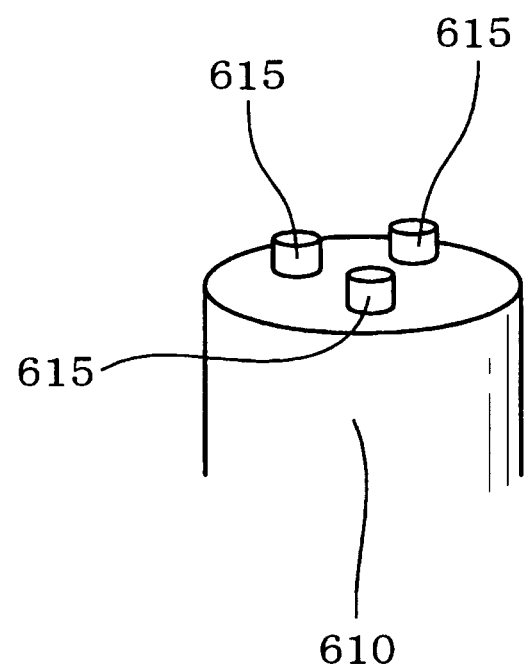
FIG. 31 shows a perspective view of a movable die that has slot formation parts for forming the slots in the twelfth embodiment.

This twelfth embodiment, as shown in FIGS. 30 and 31, is an example of the ground electrode 5 with which slots 515 of various form are formed in the fusion solidification part 511a formed on entire surface of the electric discharge surface 511.

On the electric discharge surface 511, the slots 515 of various forms such as the slots 515 having three pillar form as shown in FIG. 30 (a), the slots 515 having three straight lines joined together at the center of the electric discharge surface 511 as shown in FIG. 30 (b), and the slots 515 having two straight lines arranged in parallel as shown in FIG. 30 (c), may be formed.

Further, on the electric discharge surface 511 of the convex portion 510, the slots 515 of various forms such as the slots 515 having a plurality of straight lines arranged in parallel as shown in FIG. 30 (d), the slots 515 arranged in lattice-like form as shown in FIG. 30 (e), and the slots 515 having two straight lines cross at the center of the electric discharge surface 511 as shown in FIG. 30 (f), may be formed on the electric discharge surface 511.

Moreover, each slot 515 is formed so that it is depressed toward the rearside of the ground electrode 52 side in the electric discharge surface 511 of the convex portion 510.

Further, in forming the slot 515 of the pillar form as shown in FIG. 30 (a), a movable die 610 that has a die surface 611 provided with slot formation parts 615 having a reversed pattern of the slots 515 of the pillar form shown in FIG. 31, may be used, for example.

Further, this embodiment has the same operation and effect as the first embodiment.

Like the present embodiment, if the fusion solidification part 511a is formed on entire surface of the electric discharge surface 511, the corner portions that have the fusion solidification parts 511a may be formed in a plurality of places.

The 13th Embodiment

The 13th embodiment is explained with reference to FIG. 32.

Figure 32:
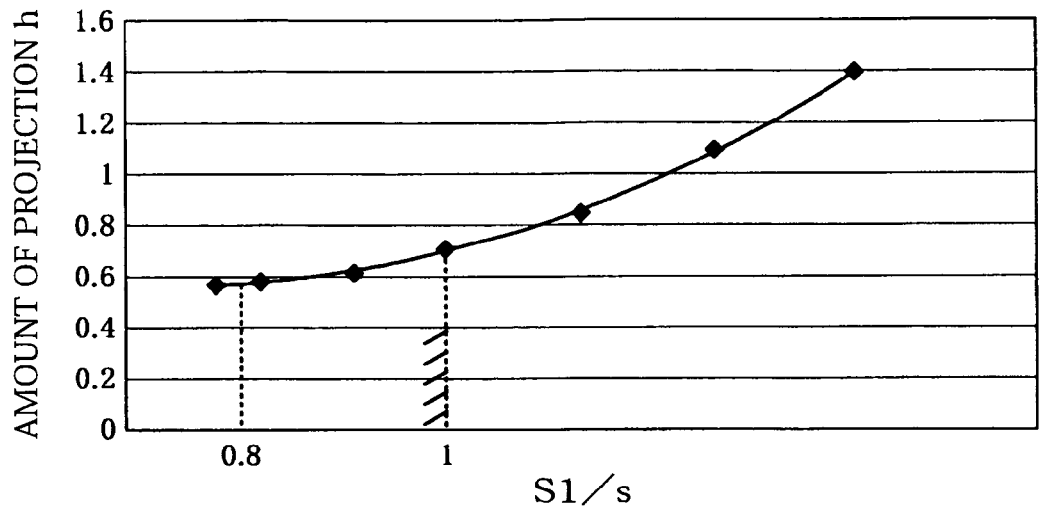
FIG. 32 shows a plot chart of a relation between S1/s, which is a relation between an area of an opening of the concave portion S1 and an average cross-section area of the convex portion s, and an amount of projection h of the convex portion in a thirteenth embodiment of the present invention.

This 13th embodiment, as shown in FIG. 32, is an example showing the relation between the relation S1/s, which is the relation between the area S1 of the opening 523 of the concave portion 520 and the average cross-section area s of the section of the convex portion 510, and the amount of projection h of the convex portion 510.

Specifically, while fixing the depth H of the concave portion 520 to 1.2 mm, the diameter D of the concave portion 520 to 1.8 mm, the thickness T of the ground electrode 5 to 1.6 mm, and the width W of the ground electrode 5 to 2.8 mm, the ground electrode 5 with values of S1/s variously different is manufactured by changing the diameter d of the convex portion 510 (refer FIG. 3 for the reference numbers).

In addition, the amount of projection h of the convex portion 510 in each case is measured.

Further, this embodiment has the same composition as the first embodiment.

A result of the measurement is shown in FIG. 32.

As shown in FIG. 32, when S1/s>=1, the amount of projection h of the convex portion 510 exceeds 0.7 mm, and the convex portion 510 can be fully projected.

On the other hand, if S1/s<1, the amount of projection h of the convex portion 510 is less than 0.7 mm, and it turns out that it is difficult to make the convex portion 510 fully projected.

Especially in the case of S1/s<0.8, it is hard to say that the route for heat radiation is fully secured since H>2h.

By this, it turns out that it is important that S1/s>=1 from a viewpoint of making the convex portion 510 fully projecting.

Although the convex portion 510 of the ground electrode 5 having the pillar form is experimented in the present embodiment, the same result is obtained even if the side surface 512 of the convex portion 510 or the side surface 522 of the concave portion 520 are tapered.

The Fourteenth Embodiment

The fourteenth embodiment is explained with reference to FIG. 33.

Figure 33:
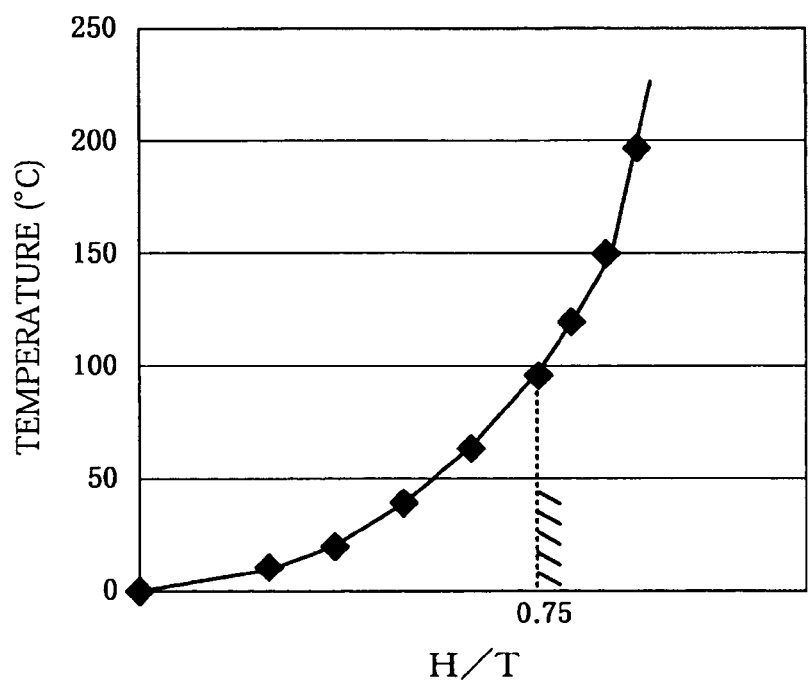
FIG. 33 shows a plot chart of a relation between H/T, which is a relation between a depth of the concave portion H and a thickness of the ground electrode T, and the temperature of the ground electrode, in a fourteenth embodiment of the present invention.
Figure 34:
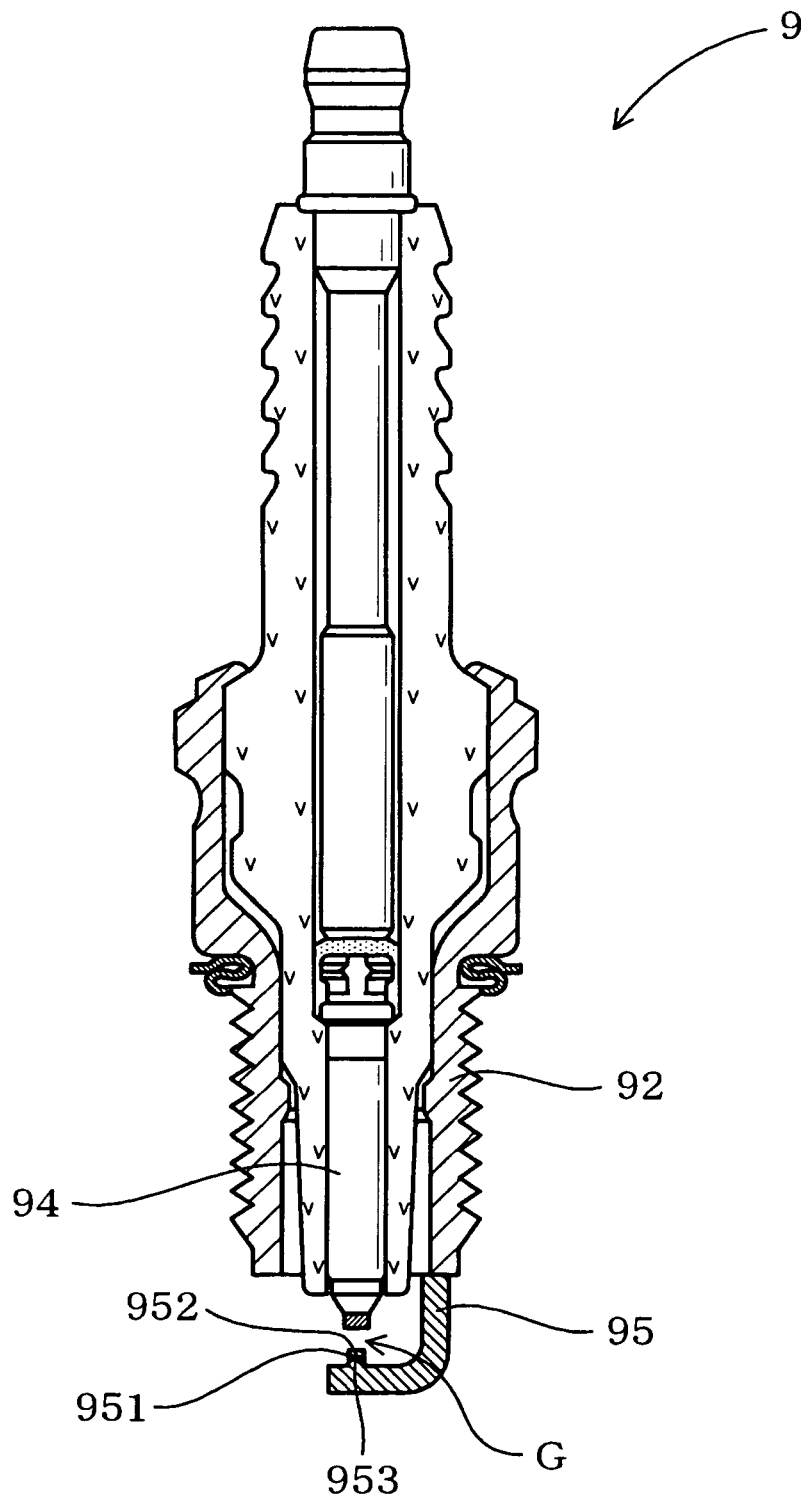
FIG. 34 shows a sectional view of a conventional spark plug in the prior art.
Figure 35:
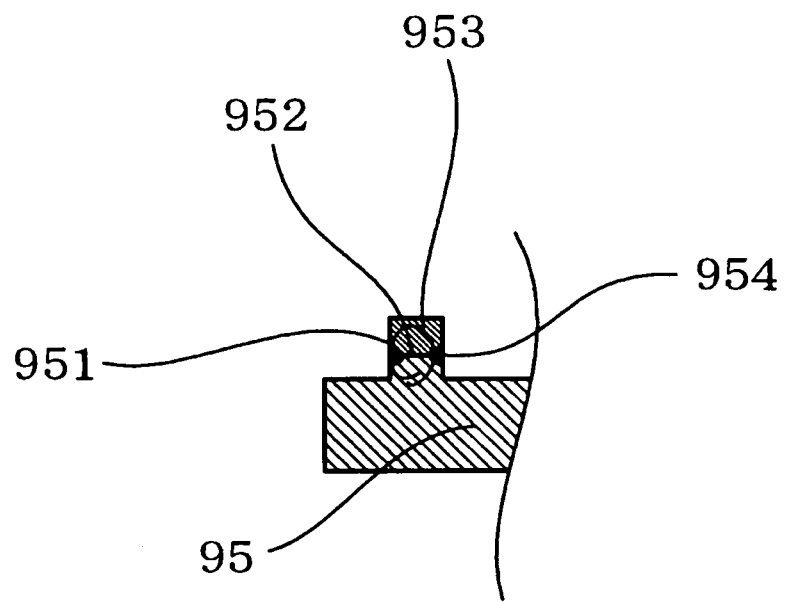
FIG. 35 shows a sectional view of a tip part of the conventional shows in FIG. 34 in the prior art.

This fourteenth embodiment, as shown in FIG. 33, is an example of the relation between H/T, which shows the relation between the depth H of the concave portion 520 and the thickness T of the ground electrode 5, and the temperature of the ground electrode 5.

Specifically, while fixing the diameter D of the concave portion 520 to 2.0 mm, the diameter d of the convex portion 510 to 1.5 mm, and the thickness T of the ground electrode 5 to 1.6 mm, the ground electrode 5 with values of H/T variously different is manufactured by variously changing the depth H of the concave portion 520 (refer FIG. 3 for the reference numbers).

Further, this embodiment has the same composition, operation and effect as the first embodiment.

An evaluation method is performed as follows.

That is, first, each ground electrode 5 and a ground electrode (henceforth a comparison sample) without having the convex portion 510 and concave portion 520 formed are heated to 730 degrees C.

Next, the temperature of the portion near the tip portion 54 rather than the concave portion 520 in each ground electrode 5 and the comparison sample is measured.

Subsequently, the increased temperature of each ground electrode 5 to the temperature of the comparison sample is computed.

It should be appreciated that in the present embodiment, the standard of increased temperature over the comparison sample is set to 100 degrees C.

This is based on that heat resistance falls and there is a possibility that the life fall of the ground electrode 5 may become remarkable, when the temperature rise is 100 degrees C. or more arises.

An evaluation result is shown in FIG. 33.

As shown in FIG. 33, the temperature increase to the comparison sample may be made small enough to 100 degrees C. or less when H/T<=0.75.

On the other hand, it turns out that the temperature increase to the comparison sample exceeds 100 degrees C., and the rate of temperature increase increases rapidly further if H/T>0.75.

From the above, it turns out from a viewpoint of heat influence of the ground electrode 5 that it is important that H/T<=0.75.

Although the convex portion 510 of the ground electrode 5 having the pillar form is experimented in the present embodiment, the same result is obtained even if the side surface 512 of the convex portion 510 or the side surface 522 of the concave portion 520 are tapered.

[The Functions and Effects]

Various kinds of embodiments of the present invention are mentioned above.

Here, functions and effects corresponding to the present invention drawn from these embodiments are summarized as follows.

The functions and effects of the first invention mentioned above are explained.

In the first invention, there is provided a spark plug for internal-combustion engines includes a mount fitting having a screw part for attachment formed on its own perimeter, a porcelain insulator that is held inside the mount fitting while it has an insulator tip part arranged so that its tip side is projected outwardly from the mount fitting, a center electrode that is held inside the porcelain insulator while it has an electrode tip part arranged so that its tip side is projected outwardly from the porcelain insulator, and a ground electrode where a spark discharge gap is formed between the ground electrode and the center electrode.

The ground electrode is fixed to the mount fitting, while the ground electrode has a convex portion. The convex portion is made of a part of base materials of the ground electrode where the part is facing the center electrode, and is projected toward the center electrode at an opposing surface, a surface at the center electrode side of the ground electrode.

The convex portion has a fusion solidification part made of precious metals and the part of the base materials melted together and solidified at least on part of an electric discharge surface that is a surface faces the center electrode.

Thereby, the spark plug for internal-combustion engines that offers excellence in durability and reliability in the joint portion at low cost is provided.

That is, since the precious metals itself melt into the base material itself, i.e., the interface of the part of the base materials of the ground electrode, the above-mentioned fusion solidification part 511a is formed in the present invention.

Thus, since the fusion solidification part is formed integrally with the part of the base materials of the ground electrode and is fully fit with other portions of the ground electrode, thermal conductivity is excellent and the temperature rise of the convex portion is suppressed.

Since all the precious metals are melted into the part of the base materials of the ground electrode unlike the former technology, the fault that the precious metals are worn does not occur. Consequently, the spark plug excellent in durability may be obtained.

Further, since the precious metals fully melt into the base material of the ground electrode to form the fusion solidification part, cracks and the oxidization of the precious metals do not occur in the fusion solidification part even if heat stress acts by a thermal cycle. For this reason, the reliability in the joint portion of the fusion solidification part and the ground electrode may be raised.

Furthermore, in order to lower demand voltage, what is necessary is just to increase the amount of projection of the convex portion 510, so that it is sufficient to use only a small amount of precious metals as compared with the former technology. Therefore, the cost of manufacturing the spark plug 1 may be lowered.

In addition, since the spark plug 1 of the present embodiment has the convex portion 510 that its electric discharge surface 511 is equipped with the fusion solidification part 511a as mentioned above, a flame core in the spark discharge gap G can be fully grown up. As a result, the spark plug 1 that is excellent in ability of igniting the spark plugs may be obtained.

According to the first invention, the spark plug for internal-combustion engines that offers excellence in durability and reliability in the joint portion at low cost is provided:

The second invention is a method of manufacturing the spark plug for internal-combustion engines. The spark plug includes the center electrode, the ground electrode where the spark discharge gap is formed between the ground electrode and the center electrode, and the convex portion. The convex portion is made of a part of base materials of the ground electrode where the part is facing the center electrode, and is projected toward the center electrode at an opposing surface, a surface at the center electrode side of the ground electrode.

According to this manufacture method, precious metals and the part of the base materials of the ground electrode are melted together by arc welding on at least a part of the electric discharge surface on the convex portion, then the melted portion is solidified afterwards.

Next, the base material of the ground electrode is positioned on the metal die that has a cavity for forming convex portion in the state where the cavity and the opposing surface face each other.

Subsequently, the convex portion having the fusion solidification part is formed at least on part of the electric discharge surface by pressing a part of the base materials of the ground electrode toward the cavity for convex portion using the pressing jig.

According to the second invention, precious metals and the part of the base materials of the ground electrode are melted together by arc welding on at least a part of the electric discharge surface, then the melted portion is solidified afterwards.

Subsequently, the convex portion having the fusion solidification part is formed at least on part of the electric discharge surface by pressing a part of the base materials of the ground electrode toward the cavity for convex portion using the pressing jig.

According to the manufacture method of the present invention, since the spark plug having the convex portion provided with the fusion solidification parts may be manufactured easily, the spark plug that offers excellence in durability and reliability in the joint portion at low cost.

The third invention is another method of manufacturing the spark plug for internal-combustion engines. The spark plug includes the center electrode, the ground electrode where the spark discharge gap is formed between the ground electrode and the center electrode, and the convex portion.

The convex portion is made of a part of base materials of the ground electrode where the part is facing the center electrode, and is projected toward the center electrode at an opposing surface, a surface at the center electrode side of the ground electrode.

The ground electrode has a concave portion that is formed on a rearside of the ground electrode facing toward an opposing surface. The rearside of the ground electrode is a surface opposite to the opposing surface in the ground electrode.

The convex portion is formed so that an extension of an axis of the convex portion passes through an area in which the concave portion is formed.

In the case of this manufacture method, precious metals and the part of the base materials of the ground electrode are melted together by arc welding on at least a part of the electric discharge surface on the convex portion, then the melted portion is solidified afterwards.

Next, the base material of the ground electrode is positioned on the metal die that has a cavity for forming convex portion in the state where the cavity and the opposing surface face each other.

Subsequently, the concave portion is formed by pressing a part of a rearside of the ground electrode using the pressing jig, while the convex portion is formed at least on a part of the electric discharge surface by pressing a part of the base materials of the ground electrode toward the cavity for convex portion using the pressing jig.

According to the manufacture method of the third invention, since the spark plug having the convex portion provided with the fusion solidification parts may be manufactured easily, the spark plug that offers excellence in durability and reliability in the joint portion at low cost, as described in the above-mentioned second invention.

In the first invention, the second invention, and the third invention, the above-mentioned spark plug for internal-combustion engines may be used as an ignition means for internal-combustions engine used in automobiles, cogenerations, gas feeding pumps, etc.

In addition, as the above-mentioned precious metals, there are Ir (iridium), Pt (platinum), Rh (rhodium), etc., for example.

A boundary of the fusion solidification part and the base material of the ground electrode may be assigned as follows, for example.

That is, a 1% or less part of the precious-metals ingredient can be pinpointed by picturizing a section cut in parallel with the axial direction of the convex portion in SEM (scanning electron microscope), and analyzing the SEM photograph by observation or the EDX method. This part can be used as the boundary accordingly.

In the spark plug of the first and the second inventions, it is explained that the side inserted into the combustion chamber of the internal-combustion engine is called the tip side, and its opposing side is called the base side.

In addition, for the arc welding mentioned in the second and third invention, various types, such as plasma arc welding, covering arc welding, submerging arc welding, inert gas welding, MAG welding (includes carbon dioxide arc welding), and self shield arc welding, are admitted.

Further, in the spark plug of the first invention, it is preferred that the fusion solidification part is formed on the entire surface of the electric discharge surface.

In this case, wear of the convex portion may be suppressed further.

That is, the sparks tend to fly to the corner portion formed between the side surface of the convex portion and the electric discharge surface especially from the center electrode. Therefore, the fusion solidification part may be arranged also to this part by the above-mentioned composition. Consequently, wear of the convex portion 510 may be suppressed further.

Further, as for the above-mentioned convex portion, it is preferred to have the slot formed so that it is depressed toward the rearside of the ground electrode side in the electric discharge surface that faces the center electrode.

In this case, a full length of the corner portion in the electric discharge surface of the convex portion may be lengthened. Thereby, a plurality of strong electric field may be formed, thus demand voltage may be reduced. As a result, the ability of igniting the spark plugs is raised.

Further, the chip including one or more precious metals with any one of Pt, Ir, Rh or W may be welded to the electric discharge surface of the convex portion that faces the center electrode.

In this case, the reliability in joint of the chip and the ground electrode may be raised. That is, according to the above-mentioned composition, the chip that includes the precious metals will be welded to the surface of the electric discharge surface that has a welding portion.

For this reason, the heat stress that acts from the base material of the ground electrode to the chip may be eased by the fusion solidification part, thus the reliability in joint of the chip and the ground electrode may be raised.

In addition, the chip including more than one kind of Pt, Ir, Rh, or W may be attached to the fusion solidification part.

As a result of the above composition, the spark plug that is excellent in ability of igniting the spark plugs may be obtained at low cost.

That is, when attaching the chip including the precious metals further on the electric discharge surface of the convex portion as mentioned above, even if in the case where the amount of projection from the opposing surface is made the same, quantity of the precious metals used only the part in which the convex portion is formed for the ground electrode may be lessened rather than the case where the chip is only attached in the opposing surface.

For this reason, the material cost of the spark plug may be reduced. In addition, since the chip is attached in the direction that approaches the electrode tip part further rather than the electric discharge surface of the convex portion, demand voltage may be reduced compare with the case of only having the convex portion formed, thus the ability of igniting the spark plugs may be raised.

It should be appreciated that the main ingredient in this specification means that the content to the whole chip that consists of the precious metals contains exceeding 50%.

Further, it is preferred that the ground electrode has a concave portion that is formed on a rearside of the ground electrode facing toward an opposing surface. The rearside of the ground electrode is a surface opposite to the opposing surface in the ground electrode.

The convex portion is formed so that an extension of an axis of the convex portion passes through an area in which the concave portion is formed.

In this case, the spark plug may be manufactured easily. That is, the convex portion may be formed at the same time when the concave portion is formed by pressing the part of the rearside of the ground electrode with the pressing jig etc., for example.

Therefore, the convex portion that has the fusion solidification part may be formed easily in this case; as a result, the spark plug of the present embodiment may be manufactured easily.

In the above-mentioned spark plug, it is preferred that when the area of the opening of the concave portion is set to S1, and the average cross-section area of the section of the convex portion that intersects perpendicularly in the axial direction of the spark plug is set to s, the relation of $S1 \geq s$ is satisfied.

In this case, the spark plug that is excellent in heat resistance may be obtained.

That is, the convex portion can be formed by projecting the part of the base materials of the ground electrode onto the opposing surface by forming the concave portion by pushing out the part of the rearside of the ground electrode.

However, the convex portion can be fully projected even if the depth of the concave portion is small, since there is a relation of $S1 \geq s$.

For this reason, route for heat radiation of the ground electrode is also fully securable, since the thickness of the base material of the ground electrode in the neighborhood of the concave portion is fully securable. As a result, the spark plug that is excellent in heat resistance may be obtained.

In the embodiment mentioned above, the average cross-section area s of the convex portion is obtained by dividing a volume of the convex portion by the amount of projection.

In the above-mentioned spark plug, it is preferred that when the average cross-section area of the section of the concave portion that intersects perpendicularly in the axial direction is set to S2, the relation of $S2 \geq s$ is satisfied.

In this case, the convex portion may be fully projected even if the depth of the concave portion is small. For this reason, the spark plug that is excellent in productivity and heat resistance may be obtained.

In this specification, the average cross-section area S2 of the concave portion is obtained by dividing the volume of the concave portion by the depth of the concave portion.

Further, in the above-mentioned spark plug, it is preferred that when the thickness of the ground electrode is set to T, and the depth in the axial direction of the spark plug is set to H, the relation of $H \leq (3/4) T$ is satisfied.

In this case, the thickness of the ground electrode in the neighborhood of the concave portion is fully securable. As a result, the spark plug 1 that is further excellent in heat resistance may be obtained.

Furthermore, it is preferred that the convex portion and the concave portion are formed nearly in pillar shapes, and when the diameter of the convex portion is set to d, and the diameter of the concave portion is set to D, the relation of $D \geq d$ is satisfied.

In this case, the spark plug that is excellent in productivity and heat resistance may be obtained as well.

In the above-mentioned spark plug, it is preferred that when the amount of the projection of the convex portion in the axial direction of the spark plug is set to h, and the depth of the concave portion in the axial direction of the spark plug is set to H, the relation of H<=2h is satisfied.

In this case, the convex portion can be fully projected while the thickness of the ground electrode in the neighborhood of the concave portion is fully securable.

As a result, the spark plug 1 that is excellent in the ability of igniting spark plugs and heat resistance may be obtained. It is more preferred that H<=h.

In addition, in the second and the third invention, it is preferred that the ground electrode is pressed by the pressing jig in the state where its both side surfaces in a width direction contact with the contacting surface provided in the metal die.

In this case, when pushing out the part of the base materials of the ground electrode with the pressing jig, deforming of the ground electrode by spreading to the width direction can be prevented, thus the convex portion may be made surely projected.

Further, it is preferred that the ground electrode is pressed by the pressing jig in the state where the tip portion contacts the tip-contacting surface that is formed in the metal die.

In this case, when pushing out the part of the ground electrode with the pressing jig, deforming of the ground electrode by spreading to the width direction can be prevented, thus the convex portion may be made surely projected.

Furthermore, a movable die that is slidable to the cavity is inserted to the metal die. The movable die has its die surface, which faces the ground electrode, formed in a plane shape, and it is preferred that the electric discharge surface of the convex portion is formed by the die surface of the movable die when forming the convex portion by pushing the part of the base materials of the ground electrode to the cavity for convex portion.

In this case, the electric discharge surface of the convex portion may be made flat by plane shaped die surface, thus it becomes easy to form the corner portions between the electric discharge surface of the convex portion and the side surface.

Here, when the spark plug is used by attaching it on an internal-combustion engine, the sparks discharge toward the above-mentioned corner portion from the electrode tip part in an initial state.

Moreover, by this spark discharge, the convex portion gradually wears out from the corner portion. After the corner portion is lost, wearing of the entire convex portion advances, and the spark discharge gap expands.

That is, in the spark plug manufactured by the above-mentioned method, the convex portion may be first worn out from the corner portion.

Therefore, the life of the convex portion, i.e., the life of the spark plug can be lengthened as the convex portion has the corner portion.

In addition, the amount of projection of the convex portion may be easily adjusted by adjusting the position of the movable die.

Further, since the movable die is slidable to the cavity, the ground electrode may be released from the metal die easily after the convex portion is formed Furthermore, in forming the convex portion, a part of the rearside of the ground electrode may be pressed twice or more with the pressing jig. In this case, the corner portion may be formed surely in the electric discharge surface of the convex portion.

That is, even if the corner portion in the electric discharge surface cannot be fully formed by a single press of the ground electrode by the pressing jig, the corner portion may be surely formed in the electric discharge surface by pressing the ground electrode twice or more.

Thereby, the demand voltage may be reduced and the spark plug that is excellent in the ability of igniting the spark plug may be obtained.

Further, it is preferred that the metal die is provided with the movable die having slot formation parts for forming the slot that is depressed toward the rearside of the ground electrode side in the electric discharge surface that faces the center electrode.

In this case, a plurality of strong electric field may be formed, thus demand voltage may be reduced. As a result, the ability of igniting the spark plugs is raised.

Furthermore, the chip including one or of precious metals with any one of Pt, Ir, Rh or W may be welded to the electric discharge surface after forming the convex portion.

In this case, as mentioned above, the spark plug that is excellent in ability of igniting the spark plugs may be obtained at low cost.

In addition, the chip of precious metal with one or more Pt, Ir, Rh, or W may be attached to the fusion solidification part.

It should be appreciated that the present invention is not limited to the compositions given in the embodiments mentioned above, but may be performed in many different variations using well-known technology in the range that does not deviate from the meaning of the present invention, and modifications of the variations belong to the range of the present invention as well.

What is claimed is:

1. A spark plug for internal-combustion engines comprising:
   a mount fitting having a perimeter provided with a screw part for attachment formed on;
   a porcelain insulator that is held inside the mount fitting and that has an insulator tip part arranged to be projected outwardly from the mount fitting;
   a center electrode that is held inside the porcelain insulator and that has an electrode tip part arranged to be projected outwardly from the porcelain insulator; and
   a ground electrode where a spark discharge gap is formed between the ground electrode and the center electrode while a precious metal is provided on an electric discharge surface being opposed to the center electrode, the electric discharge surface being part of an opposing surface of the ground electrode, the opposing surface being opposed to the center electrode,
   wherein, the ground electrode is fixed to the mount fitting, while the ground electrode has a convex portion;
   the convex portion is made of a part of base materials of the ground electrode, and is projected toward the center electrode from the opposing surface of the ground electrode;
   the convex portion has a fusion solidification part made of the precious metal and the part of the base materials and is formed on an entire area of the electric discharge surface to be solidified at the entire electric discharge surface, wherein the fusion solidification part is produced by melting and solidifying the precious metal and the part of the base materials,
   the ground electrode has a concave portion formed on a rear side of the ground electrode, the concave portion being formed toward the opposing surface, the rear side being back-to-back to the opposing surface; and the convex portion is formed such that an extension of an axis of the convex portion passes through an area in which the concave portion is formed on the rear side, wherein, when an area of an opening of the concave portion is set to S1, and an average cross-section area of a section of the convex portion, which section intersects perpendicularly to an axial direction of the spark plug, is set to s, the relation of S1>=s is satisfied; and when an average cross-section area of a section of the concave portion, which section intersects perpendicularly in the axial direction, is set to S2, the relation of S2>=s is satisfied.

2. The spark plug according to claim 1, wherein, the convex portion has a slot formed such that the slot is depressed toward the rearside of the ground electrode in the electric discharge surface.

3. The spark plug according to claim 1, wherein,
a precious metal chip including as a major component any one of Pt, Ir, Rh and W is welded to the fusion solidification part.

4. The spark plug according to claim 1, wherein,
a precious metal chip including at least one chosen from the group consisting of Pt, Ir, Rh and W is attached to the fusion solidification part.

5. The spark plug according to claim 1, wherein,
when a thickness of the ground electrode is set to T, and a depth in the axial direction of the spark plug is set to H, the relation of H<=(3/4) T is satisfied.

6. The spark plug according to claim 1, wherein,
when a diameter of the convex portion is set to d, and a diameter of the concave portion is set to D, the relation of D>=d is satisfied.

7. The spark plug according to claim 1, wherein,
when an amount of a projection of the convex portion in an axial direction of the spark plug is set to h, and a depth of the concave portion in the axial direction of the spark plug is set to H, the relation of H<=2h is satisfied.

* * * * *